(12) United States Patent
Huang et al.

(10) Patent No.: US 10,396,900 B2
(45) Date of Patent: Aug. 27, 2019

(54) COMMUNICATION APPARATUS AND METHOD OF CONTROLLING TRANSMISSION SIGNAL

(71) Applicant: FUJITSU LIMITED, Kawasaki-shi, Kanagawa (JP)

(72) Inventors: Guoxiu Huang, Kawasaki (JP); Setsuo Yoshida, Inagi (JP); Takeshi Hoshida, Kawasaki (JP); Hisao Nakashima, Kawasaki (JP); Shoichiro Oda, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/923,129

(22) Filed: Mar. 16, 2018

(65) Prior Publication Data
US 2018/0278336 A1 Sep. 27, 2018

(30) Foreign Application Priority Data

Mar. 22, 2017 (JP) .................................. 2017-056349

(51) Int. Cl.
H04B 10/2569 (2013.01)
H04B 10/2507 (2013.01)
H04B 10/564 (2013.01)
H04B 10/50 (2013.01)
H04B 10/532 (2013.01)
H04J 14/08 (2006.01)
H04B 10/61 (2013.01)

(52) U.S. Cl.
CPC ....... H04B 10/564 (2013.01); H04B 10/2569 (2013.01); H04B 10/2572 (2013.01); H04B 10/503 (2013.01); H04B 10/532 (2013.01); H04B 10/6162 (2013.01); H04J 14/08 (2013.01)

(58) Field of Classification Search
None
See application file for complete search history.

(56) References Cited

U.S. PATENT DOCUMENTS 5,361,270 A * 11/1994 Heismann ............. G02F 1/0136
372/27
5,371,597 A * 12/1994 Favin ................... G01M 11/333
356/364
6,744,509 B2 * 6/2004 Davis ....................... G01J 4/00
356/367

(Continued)

FOREIGN PATENT DOCUMENTS

JP 8-005461 1/1996
JP 2014-220822 11/2014
JP 2015-192313 11/2015

Primary Examiner — Li Liu
(74) Attorney, Agent, or Firm — Fujitsu Patent Center

(57) ABSTRACT

A method of controlling a transmission signal, includes transmitting a training signal including four polarization states having a given relation; and performing rotation control and transmission power level control of a polarization component of a data signal, based on a rotation control matrix for a polarization state and an inverse-operation control matrix for a power level imbalance, which are estimated from Stokes parameters related to input power level present on a Poincare sphere acquired from the training signal and Stokes parameters related to output power level present on the Poincare sphere.

18 Claims, 22 Drawing Sheets

(56) References Cited

U.S. PATENT DOCUMENTS

| | | | | |
|---|---|---|---|---|
| 6,762,829 B2* | 7/2004 | Babin | ............... | G01M 11/337 |
| | | | | 356/73.1 |
| 6,856,398 B2* | 2/2005 | Ruchet | ............... | G01M 11/331 |
| | | | | 356/453 |
| 7,030,973 B2* | 4/2006 | Rasmussen | ............... | G01J 4/00 |
| | | | | 356/73.1 |
| 7,081,959 B2* | 7/2006 | Waagaard | ............... | G01D 5/345 |
| | | | | 356/478 |
| 7,151,898 B1* | 12/2006 | Phua | ............... | H04B 10/2569 |
| | | | | 398/158 |
| 7,257,290 B2* | 8/2007 | Bulow | ............... | H04B 10/2513 |
| | | | | 385/11 |
| 8,059,958 B1* | 11/2011 | Jiang | ............... | H04B 10/0795 |
| | | | | 398/28 |
| 8,736,826 B2* | 5/2014 | Lovely | ............... | G01D 5/353 |
| | | | | 356/73.1 |
| 2007/0002321 A1* | 1/2007 | Desfonds | ............... | G01J 4/04 |
| | | | | 356/367 |
| 2008/0030839 A1* | 2/2008 | Yao | ............... | G02F 1/0136 |
| | | | | 359/281 |
| 2010/0315640 A1* | 12/2010 | Webb | ............... | H04B 10/2569 |
| | | | | 356/364 |
| 2017/0122809 A1* | 5/2017 | Kanda | ............... | G01J 4/00 |

* cited by examiner

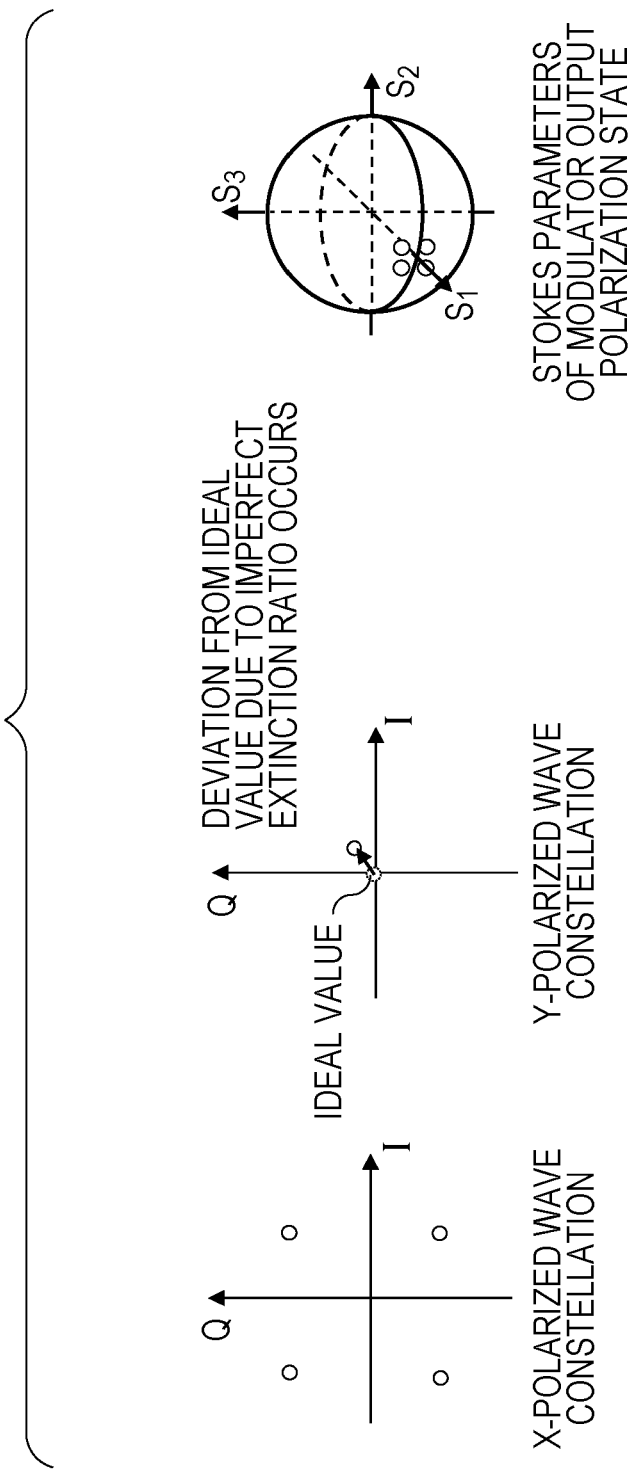

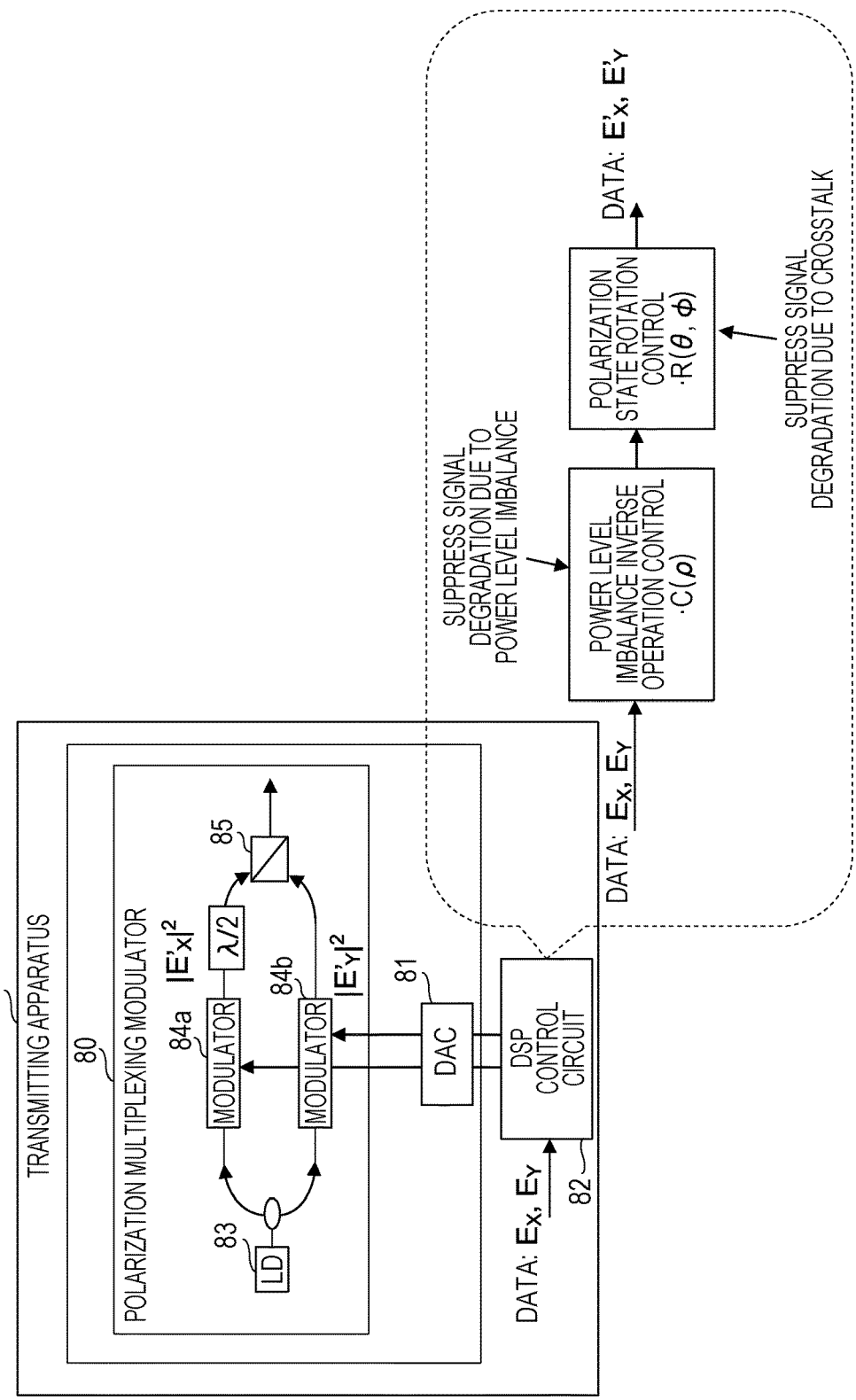

SIGNAL PHASE: $\Phi_{kn} = \pi/4(2n-1)$

POLARIZATION STATE AFTER COUPLING OF
X-POLARIZED WAVES AND Y-POLARIZED WAVES
(STOKES PARAMETERS ARE DISTRIBUTED ON SAME CIRCLE)

$\updownarrow$ $(S_0=0, S_1=-1, S_2=0, S_3=0)$
$\leftrightarrow$ $(S_0=0, S_1=1, S_2=0, S_3=0)$
↗ $(S_0=0, S_1=0, S_2=1, S_3=0)$
↘ $(S_0=0, S_1=0, S_2=-1, S_3=0)$
↻ $(S_0=0, S_1=0, S_2=0, S_3=-1)$
↺ $(S_0=0, S_1=0, S_2=0, S_3=1)$ $S_1 = |E_X|^2 - |E_Y|^2$ $S_2 = 2\text{Re}(E_X E_Y^*)$ $S_3 = -2\text{Im}(E_X E_Y^*)$ $|E_X|^2 = |E_Y|^2$ IN CASE OF QPSK SIGNAL PHASE: $\Phi_{kn} = n\pi/4$

COMMUNICATION APPARATUS AND METHOD OF CONTROLLING TRANSMISSION SIGNAL

CROSS-REFERENCE TO RELATED APPLICATION

This application is based upon and claims the benefit of priority of the prior Japanese Patent Application No. 2017-56349, filed on Mar. 22, 2017, the entire contents of which are incorporated herein by reference.

FIELD

The embodiment discussed herein is related to an optical communication apparatus and a method of controlling an optical transmission signal.

BACKGROUND

In optical networks, a polarization multiplexing technology and a polarization time multiplexing technology are used in order to improve the spectrum utilization efficiency (see, for example, Japanese Laid-open Patent Publication No. 2014-220822). In these technologies, signals are transmitted using optical devices such as optical fibers, multiplexing/demultiplexing devices, optical attenuators, and optical switches.

Firstly, polarization multiplexing is described. The polarization multiplexing modulates a main data signal to two polarization components, in other words, a polarization component State Of Polarization (SOP) 1 and a polarization component SOP2, and multiplexes and transmits the SOP1 and the SOP2 orthogonal to each other. For example, as illustrated in FIG. 16, the polarization multiplexing (PoIMUX) modulates a main data signal to the SOP1 and the SOP2, and inserts the SOP1 and the SOP2 on the time axis and transmits the SOP1 and the SOP2. Meanwhile, the polarization time multiplexing (PolTDM) modulates a main data signal to the SOP1 and the SOP2, and alternately inserts the SOP1 and the SOP2 on the time axis and transmits the SOP1 and the SOP2.

Next, signal degradation caused by the PDL (polarization dependent loss) is described. The PDL refers to a light loss that signal light receives from a transmission line and the like. A received signal is separated into the polarization components SOP1 and SOP2 at a reception side (for example, coherent receiver) of the signal but the signal degradation is caused because the PDL is present in the transmission line.

The first signal degradation is signal degradation due to a power level imbalance. The SOP1 and the SOP2 have different losses generated during the transmission, thereby generating variations in the transmission quality. In other words, as illustrated in FIG. 17, the SOP1 and the SOP2 have the same power level before the transmission (solid line) but have different power levels after the transmission (dashed line) due to the influence of the PDL (a difference is generated). Moreover, it is understood from FIG. 17 that the polarization state on the Poincare sphere is changed between before the transmission and after the transmission due to the transmission. The Poincare sphere represents all the polarization states in one coordinate system, and is used to grasp transition of the polarization states.

The second signal degradation is signal degradation due to a loss of orthogonality. The SOP1 and the SOP2 have the changed polarization states due to the transmission, and lose the orthogonality after the transmission (dashed line) as illustrated in FIG. 18, which results in the generation of crosstalk, in other words, a leakage of the signal. This generates the signal degradation. In the example illustrated in FIG. 18, the above-described level imbalance of the power level is not generated but the orthogonal relation is lost between before and after the transmission (θ2 is not equivalent to θ1). Moreover, it is understood from FIG. 18 that the polarization state on the Poincare sphere is changed between before the transmission and after the transmission due to the transmission.

A method of suppressing the abovementioned signal degradation includes: transmitting some polarization states of the detection signal to the reception side; detecting a polarization state having a best (minimum) bit error rate (BER) at the reception side; and transmitting (feeding back) the result to the transmission side. The transmission side modulates a transmission signal based on the received result (polarization state), and transmits the transmission signal. This makes it possible to suppress the signal degradation.

However, the nonlinear degradation may increase or decrease when, for example, the number of channels dynamically increase or decrease in a transmission line in the course of measuring a detection signal, in other words, the status of the transmission line changes, and thus the result of the BER may become better or worse. In other words, the result of the BER is influenced due to a cause other than the PDL, so that the signal degradation due to the influence of the PDL is failed to be efficiently suppressed in some cases. The nonlinear degradation refers to degradation due to a nonlinear phenomenon (such as self phase modulation) that occurs in the transmission line.

Moreover, the method of suppressing the signal degradation includes a method in which a power level imbalance between two polarization components of a main data signal is determined (power level comparison at the receiver side) based on the power level, and resolves the power level imbalance (see FIG. 19). However, this method causes such a problem that the long converge time is used because the control is requested to perform with the certain steps to optimize the power level imbalance.

Moreover, the method of suppressing the signal degradation includes a method (PDL compensation method) in which the reception side analyzes the distribution (see FIGS. 20A-20D) of reception signals on the Poincare sphere, and returns the distribution to the distribution of transmission signals on the Poincare sphere (see FIGS. 20A-20D), thereby performing polarization multiplexing isolation. FIGS. 20A-20D illustrates a polarization state after X-polarized waves and Y-polarized waves are coupled.

FIG. 20A illustrates a state (polarization state of reception signals) in which the polarization state of transmission signals is rotated due to the transmission. This state is a state that may be returned to the distribution of transmission signals by the rotation at the reception side. FIG. 20B illustrates a state (polarization state of reception signals) in which the polarization state of transmission signals receives an influence of the PDL due to the transmission, and is apart from the center of the Poincare sphere by a distance d. This state is a state of a difference of the power levels before and after the transmission. FIG. 20C illustrates a state (polarization state of reception signals) in which the polarization state of transmission signals receives an influence of the PDL due to the transmission to be apart from the center of the Poincare sphere by a distance D, and is further rotated. This state is a state of a difference of the power levels before and after the transmission. FIG. 20D illustrates a method of returning the reception signal to the distribution of transmission signals on the Poincare sphere. The reception signal is returned to the distribution of transmission signals by the three-step movement of the center this case. Returning to the distribution of transmission signals on the Poincare sphere makes it easy to isolate the polarized and multiplexed signal, and makes it possible to suppress the influence of the PDL.

The PDL compensation method is digital signal processing only at the reception side, which provides no feedback to the transmission side, and the variations in penetrating characteristics of four signal points on the Poincare sphere occurs, thereby generating a difference of the respective optical signal to noise ratios (OSNR). The OSNR is a power ratio between the optical signal and the noise. Therefore, it is impossible to minimize the signal degradation.

Moreover, the methods of suppressing the PDL illustrated in FIG. 19 and FIGS. 20A-20D have such as a problem that an influence of a loss of the orthogonality during the transmission is not considered.

However, signals are subjected to random disturbances due to the polarization variation when the transmission penetrating characteristics have a polarization dependence to cause polarization noise. This polarization noise lowers the transmission quality in optical communications. Therefore, the optical device used in the optical communication, particularly in the Wavelength Division Multiplexing (WDM)/Dense WDM (DWDM) transmissions, is desired to have as small a variation of the transmission loss due to the polarization as possible, that is, as small an influence from Polarization Dependent Loss (PDL) as possible.

SUMMARY

According to an aspect of the embodiments, a method of controlling a transmission signal, includes transmitting a training signal including four polarization states having a given relation; and performing rotation control and transmission power level control of a polarization component of a data signal, based on a rotation control matrix for a polarization state and an inverse-operation control matrix for a power level imbalance, which are estimated from Stokes parameters related to input power level present on a Poincare sphere acquired from the training signal and Stokes parameters related to output power level present on the Poincare sphere.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is a diagram for explaining a case where an influence of the imperfect extinction ratio is received;

FIG. 8 is a diagram illustrating a configuration example of a control circuit of the transmitting apparatus in the embodiment;

DESCRIPTION OF EMBODIMENT

Hereinafter, an embodiment is described with reference to the drawings. Based on the above-described problems, a transmitting apparatus 1 according to an embodiment constituting a communication apparatus in the embodiment transmits a training signal (four polarization states having a given relation on the Poincare sphere) to a receiving apparatus 2. A receiver of the receiving apparatus 2 receives the training signal, and an estimating section thereof estimates a Mueller matrix based on the received training signal. Specifically, the receiving apparatus 2 estimates elements related to the power level of the Mueller matrix, from the Stokes parameters related to the input power level present on a Poincare sphere acquired from the training signal and the imbalanced Stokes parameters related to the output power level present on the Poincare sphere. The estimation by the receiving apparatus 2 may be performed in a controller 11 of the transmitting apparatus 1.

In addition, the transmitting apparatus 1 in the embodiment performs, based on a polarization state rotation control matrix and a power level imbalance inverse operation control matrix that are estimated from a Mueller matrix obtained by the receiving apparatus 2, rotation control and transmission power level control of polarization components of the main data signal. Specifically, the controller 11 of the transmitting apparatus 1 performs, based on a polarization state rotation control matrix and a power level imbalance inverse operation control matrix that are estimated from the Stokes parameters related to the input power level present on a Poincare sphere acquired from the training signal and the imbalanced Stokes parameters related to the output power level present on the Poincare sphere, rotation control and transmission power level control of polarization components of the data signal.

The Mueller matrix is a matrix a part of which represents a relation between stokes parameters of the input and the output of a measurement device (DUT). Specifically, the second row to the fourth-row elements of the Mueller matrix represent a relation between polarization states of the input and the output, however, only the first row element related to the power level is used herein and the second row to the fourth row elements are not used. The relation between polarization states of the input and the output refers to the rotation of the polarization state during the transmission. The rotation of the polarization state during the transmission has no influence herein, thus, a case where no rotation of the polarization state during the transmission occurs is explained in FIG. 10 and FIG. 12, which are described later.

Figure 1:
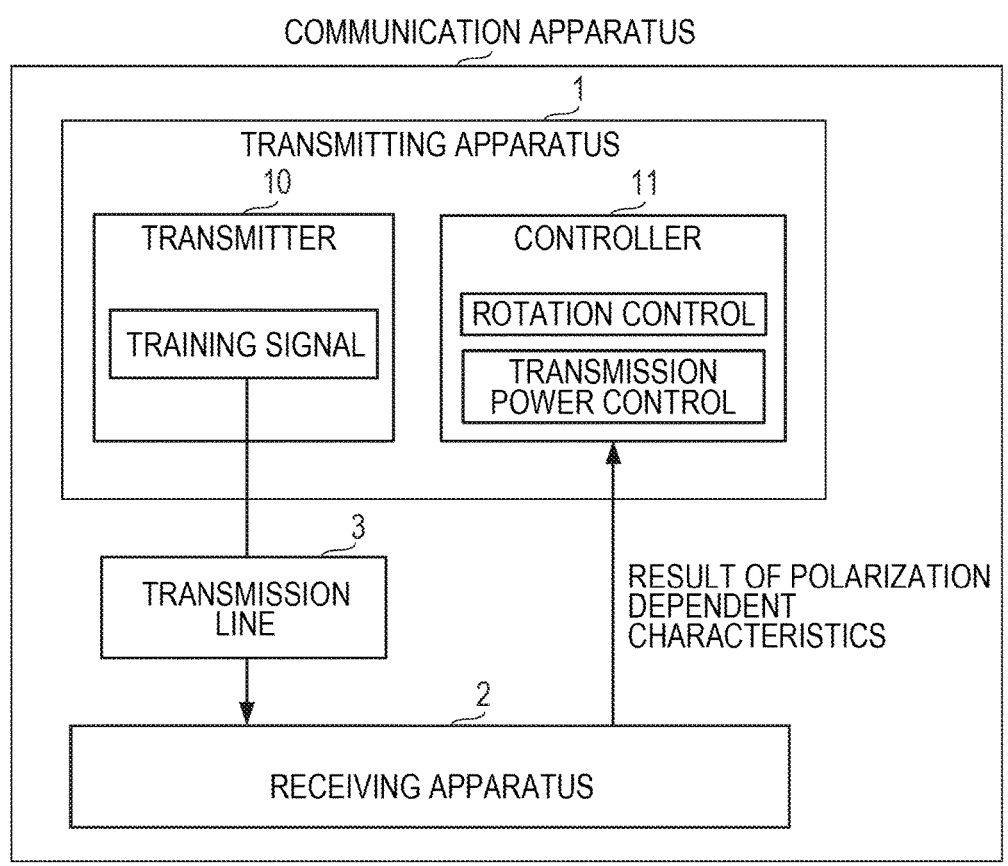
FIG. 1 is a functional block diagram of a transmitting apparatus according to an embodiment.

FIG. 1 is a functional block diagram illustrating a configuration of the transmitting apparatus 1 in the embodiment. The transmitting apparatus 1 in the embodiment includes a transmitter 10 and the controller 11. The transmitter 10 may be implemented by, for example, a polarization multiplexing modulator and a digital to analog convertor (DAC: digital analog conversion circuit). The controller 11 for the transmitter 10, may be implemented by, for example, a processor including a CPU, a digital signal processor (DSP), a microprocessor or a programmable logic device (PLD). The configuration of the transmitting apparatus 1 is not limited to the above, but may include other configurations.

The transmitter 10 transmits a training signal (for example, detection signal including four polarization states on the Poincare sphere) through the transmission line 3 to the receiving apparatus 2. In this case, the output polarization state varies when receiving an influence of the transmission environment, so that the transmitter 10 periodically transmits a training signal. Moreover, the transmitter 10 may perform single side-polarization signal modulation of a training signal, and use the remaining half transmission capacitance compare to dual-polarization modulation when transmitting the training signal for transmission of other data. This may reduce the loss of the transmission capacitance, and perform data transmission with high efficiency.

Figure 2:
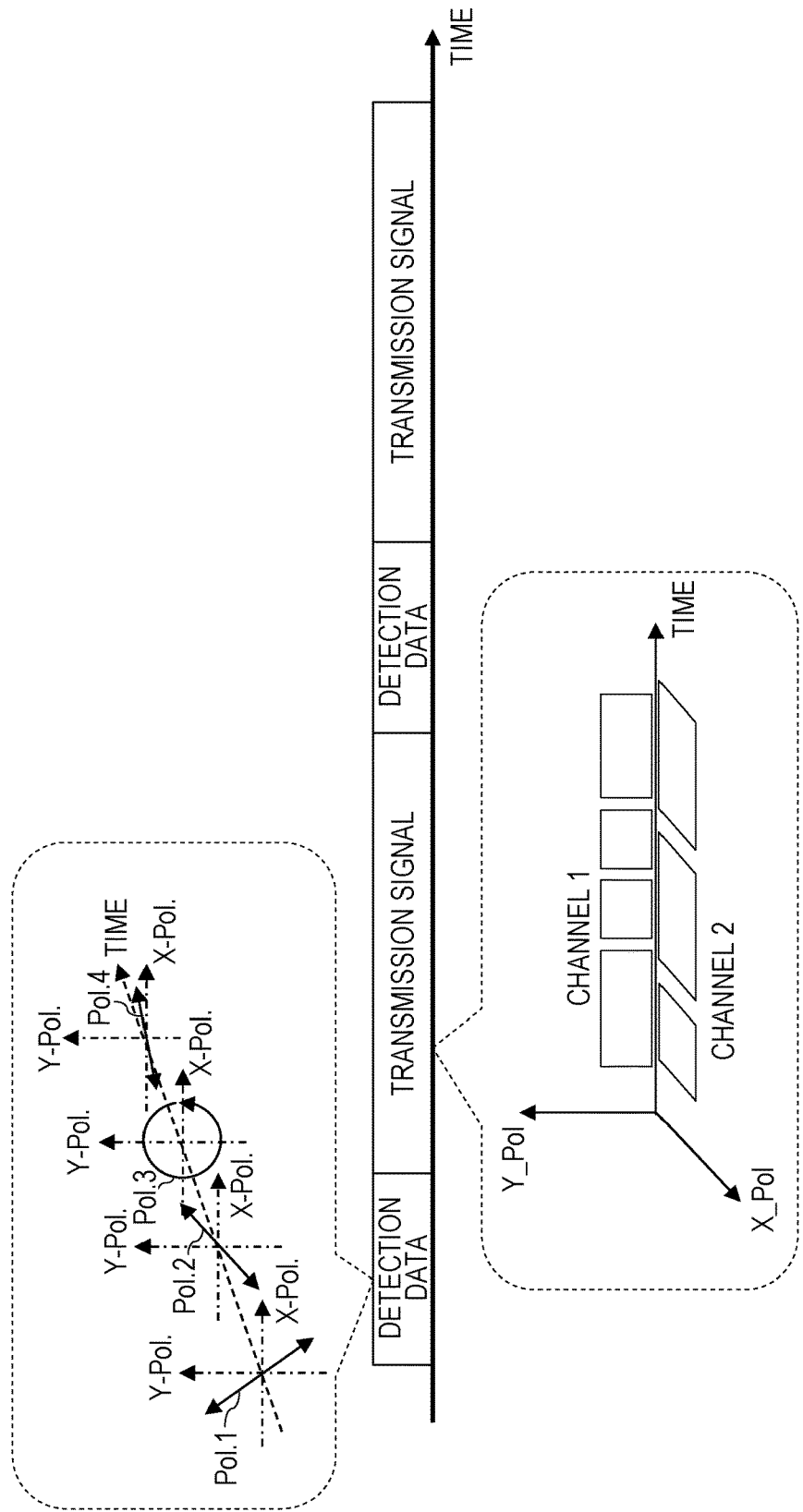
FIG. 2 is a diagram illustrating one example of a training signal.

FIG. 2 illustrates one example of a training signal. The training signal is requested to include at least four polarization states (from among Pol.1 to Pol.4, at least one polarization being a circular polarized-wave or an elliptic polarized-wave). All the four polarization states are elliptic polarized-waves or circular polarized-waves, linear polarized-waves different from one another. In this case, there is a possibility that the computation amount may increase.

A channel 1 and a channel 2 are polarization multiplexed in the transmission signal subsequent to the detection data. Although being described later, a relation between an input Sin (Stokes parameters) and an output Sout (Stokes parameters) of a training signal when being expressed using a Mueller matrix M is represented as Sout=MSin. When this mapping relation is represented on the Poincare sphere, none of the Stokes parameters of the training signal is requested to be present on the same circle in the Poincare sphere. Moreover, four parameters related to the power level of the Mueller matrix, in other words, ($M_{11}$, $M_{12}$, $M_{13}$, $M_{14}$), which are at the first row of the Mueller matrix M, are obtained. The Poincare sphere represents polarization of propagating light and change thereof, and a polarization state, for example, two poles on the sphere indicate polarization of light of the right and left rotations, and the equator refers to the linear polarization of light. The second to fourth elements of the Stokes parameter $S_{in}$ and the second to fourth elements of $S_{out}$ are parameters each indicating a polarization state.

Herein, when a polarization multiplexing modulator of the transmitter 10 modulates the polarization states of detected polarization, the output power levels of X-polarized waves and Y-polarized waves are requested to be set in a level imbalance in at least one of the four polarization states. In other words, the single-side polarization output power level is requested to set not to 0 in order to suppress the influence of an imperfect extinction ratio. The extinction ratio refers to a ratio of the light intensity of an optical signal between in an ON state and an OFF state. The low extinction ratio makes it impossible to entirely interrupt the optical signal in the OFF state. A desire of setting of the output power levels of X-polarized waves and Y-polarized waves in a level imbalance is described using FIG. 3A and FIG. 3B.

In FIG. 3A, a left diagram is a phase diagram of a real part I and an imaginary part Q of an X signal (X-polarized wave constellation) of QPSK, a center diagram is a phase diagram of a Y signal (Y-polarized wave constellation), and a right diagram is a representation diagram of Stokes parameters on the Poincare sphere.

As illustrated in the center diagram of FIG. 3A, when the output power level of Y-polarized waves is set to an ideal value 0, and an influence of the imperfect extinction ratio is received, a deviation from the ideal value occurs in the Y-polarized wave constellation (Y-polarized wave phase arrangement diagram). In this case, as illustrated in the right diagram, Stokes parameters of the modulator output polarization state become four polarization states due to the influence of the extinction ratio. This is because the polarization state in which the output power level of Y-polarized waves is the ideal value 0 is transmitted as a detection signal in the same polarization state.

Figure 3B:
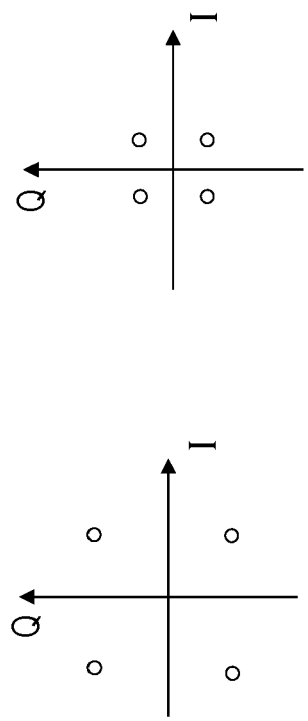
FIG. 3B is a diagram for explaining a case where an influence of the imperfect extinction ratio is not received.

Meanwhile, as illustrated in FIG. 3B, the output power level of Y-polarized waves is not 0 but the power in a level imbalance with respect to X-polarized waves, so that no influence of the imperfect extinction ratio is received, and Stokes parameters in the modulator output polarization state is in the same polarization state in $S_1$-$S_2$ planes. Accordingly, the output power levels of X-polarized waves and Y-polarized waves are requested to be set in level imbalance. This level imbalance property serves as a regularization condition for a coefficient matrix with an inverse matrix being present. Further, four parameters ($M_{11}$, $M_{12}$, $M_{13}$, $M_{14}$) of the Mueller matrix may be estimated from the input power level by expression (1) provided below.

The controller 11 performs, based on a polarization state rotation control matrix and a power level imbalance inverse operation control matrix that are estimated from the Stokes parameters related to the input power level and the polarization state present on a Poincare sphere acquired from the training signal and the Stokes parameters related to the output power level present on the Poincare sphere, rotation control and transmission power level control of polarization components of the data signal.

Herein, estimation of the Mueller matrix by the receiving apparatus 2 that is requested in order that the controller 11 performs rotation control and transmission power level control of transmission polarization state polarization components of a main data signal is described. Known input Stokes parameters provided as training signals transmitted from the transmitting apparatus 1 are assumed to be $(S_{0\_n}, S_{1\_n}, S_{2\_n}, S_{3\_n})$. Moreover, the outut power (element) on the condition of the level imbalance property induced by PDL is assumed to be $S_{out\_n}$ (this is a measurement value); n is the order of training signals in four polarization states. In this case, a part of the Mueller matrix is estimated as a solution of the following linear equation by a Mueller matrix estimation circuit, which is not illustrated, in the receiving apparatus 2, using the computation of an inverse matrix of the following coefficient matrix on the condition of a regular.

$$\begin{pmatrix} M_{11} \\ M_{12} \\ M_{13} \\ M_{14} \end{pmatrix} = \begin{pmatrix} S_{0\_1} & S_{1\_1} & S_{2\_1} & S_{3\_1} \\ S_{0\_2} & S_{1\_2} & S_{2\_2} & S_{3\_2} \\ S_{0\_3} & S_{1\_3} & S_{2\_3} & S_{3\_3} \\ S_{0\_4} & S_{1\_4} & S_{2\_4} & S_{3\_4} \end{pmatrix}^{-1} \cdot \begin{pmatrix} S_{out\_1} \\ S_{out\_2} \\ S_{out\_3} \\ S_{out\_4} \end{pmatrix} \quad (1)$$

Figure 4A:
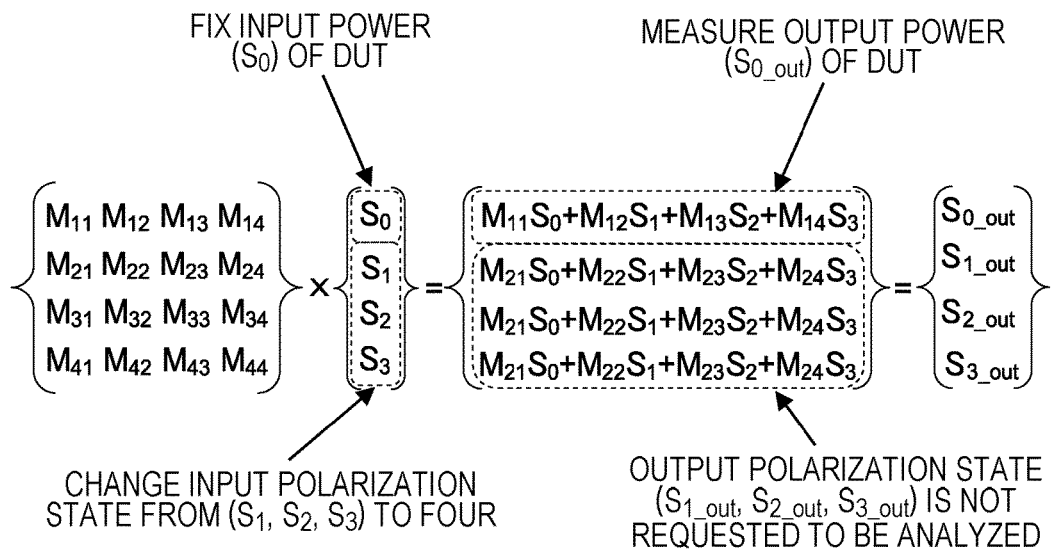
FIG. 4A is a diagram illustrating a relation between stokes parameters the input and the output of a measurement device (DUT) with a Mueller matrix; S0 represents power, is not SOP.
Figure 4B:
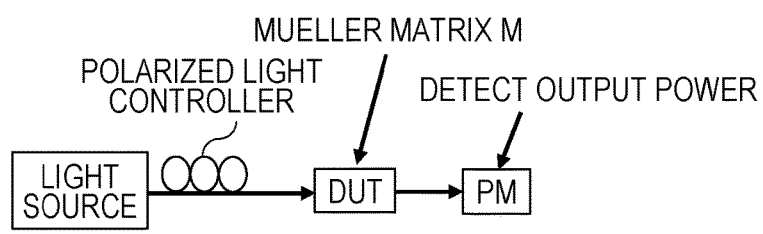
FIG. 4B is a diagram illustrating one example of a measurement configuration.

FIG. 4A illustrates a relation between polarization states of the input and the output of a measurement device (DUT) being expressed as a Mueller matrix, and FIG. 4B illustrates one example of the measurement configuration in the relation. The measurement configuration includes a light source that generates an optical signal, a polarized light controller that generates a polarized optical input signal, a DUT (optical element), and a power meter (PM) that receives an optical signal from the DUT and determines the intensity of the polarized optical signal from the DUT.

In FIG. 4A, $S_0$ to $S_3$ are Stokes parameters of the Poincare sphere, $S_0$ is the input power level of the DUT and is fixed, and $S_1$ to $S_3$ are input polarization states. The output of the DUT is obtained by multiplying the Mueller matrix by the Stokes parameters. The first row $(M_{11}S_0+M_{12}S_1+M_{13}S_2+M_{14}S_3)$ of the output is the output power level $(S_{0\_out})$ of the DUT, and the second to fourth rows thereof are output polarization states $(S_{1\_n}, S_{2\_out}, S_{3\_out})$ of the DUT. Stokes parameters $(S_0, S_1, S_2, S_3)$ of the input are changed to $(S_{0\text{-}n}, S_{1\text{-}n}, S_{3\text{-}n})$, n=1, 2, 3, 4.

Therefore, the coefficient matrix of the expression (1) is calculated. In the inverse matrix process of a coefficient matrix, as illustrated in the expression (1), the coefficient matrix is regulated by the abovementioned output power level imbalance and the condition of at least one polarization with output power levels of X-polarized waves and Y-polarized to be set in a level imbalance. Moreover, only the output power level is requested, so that the output polarization state corresponding to the element of the Mueller matrix other than $(M_{11}, M_{12}, M_{13}, M_{14})$ is not requested to be analyzed.

Further, values of four parameters $(M_{11}, M_{12}, M_{13}, M_{14})$ of the first row element of the Mueller matrix are obtained to allow PDL to be obtained using the expression of decibel (dB) by the following expression (2).

$$PDL=10\ \log((M_{11}-a)/(M_{11}+a)) \quad (2)$$

wherein, $$a=\sqrt{M_{12}^2+M_{13}^2+M_{14}^2}$$

Next, the rotation control for maintaining the orthogonality of the polarization components is described with reference to the drawings. In other words, the receiving apparatus 2 estimates a polarization state rotation control matrix $R(\theta, \phi)$, after the Mueller matrix is estimated, so as not to lose the orthogonality of the polarization components. The estimation of the polarization state rotation control matrix $R(\theta, \phi)$ and the estimation of the power level imbalance inverse operation control matrix $C(\rho)$, which is described later, are not performed by the receiving apparatus 2, but may be performed by another apparatus, which is not illustrated, or the transmitting apparatus 1.

Figure 5:
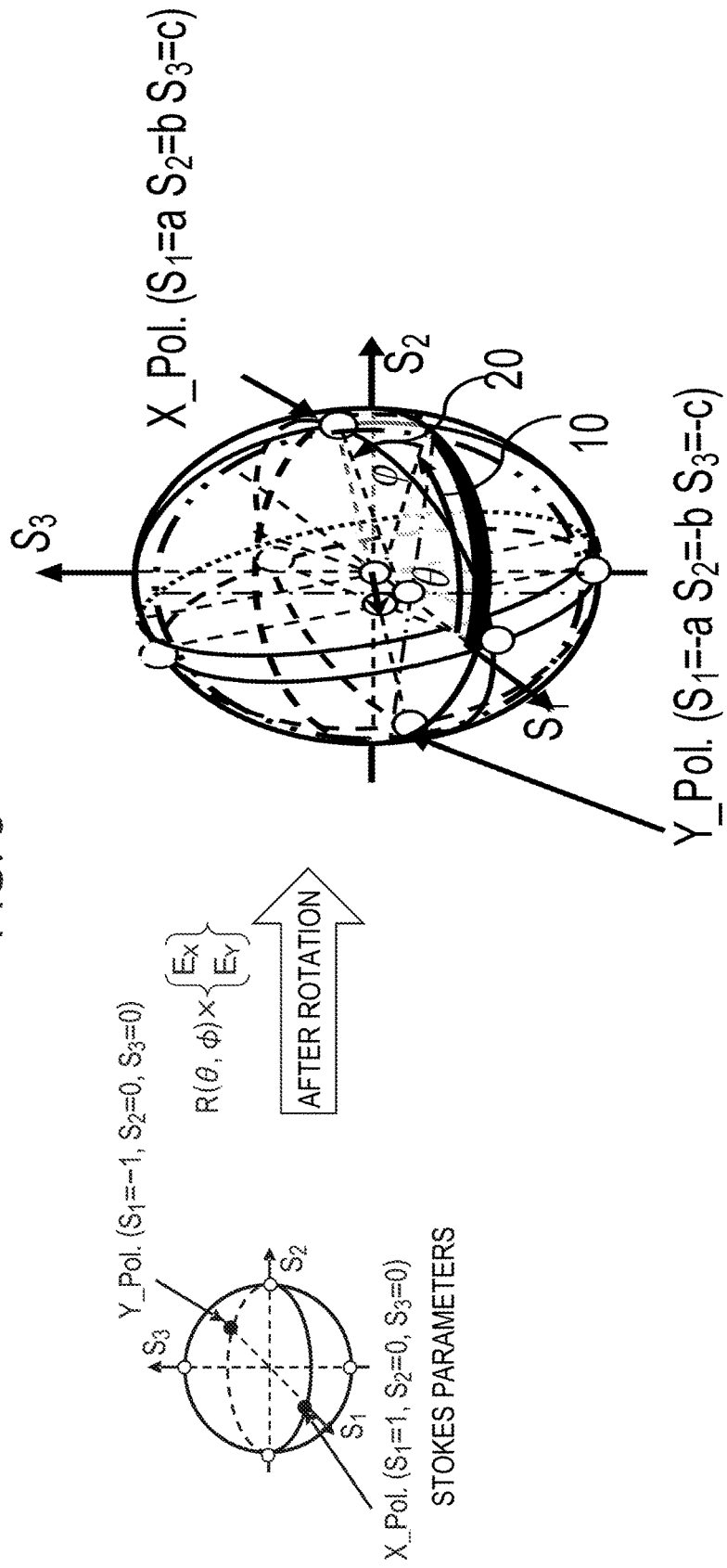
FIG. 5 is a diagram for explaining one example of an implementation method of a polarization state rotation control matrix $R(\theta, \phi)$.

One example of an estimation method of the polarization state rotation control matrix $R(\theta, \phi)$ is described using FIG. 5. Note that a represents an angle of arrow 10 at the center of the Poincare sphere and φ represents an angle of arrow 20 at the center of the Poincare sphere. The estimation of the polarization state rotation control matrix $R(\theta, \phi)$ is requested not to lose the orthogonality of the X-polarized wave (X_Pol.) and the Y-polarized wave (Y_Pol.) after the transmission. Accordingly, for example, as illustrated in FIG. 5, Stokes parameters $(S_1, S_2, S_3)=(1, 0, 0)$ of the X-polarized wave and Stokes parameters $(S_1, S_2, S_3)=(-1, 0, 0)$ of the Y-polarized wave before the transmission are assumed. As a result, Stokes parameters $(S_1, S_2, S_3)=(a, b, c)$ of the X-polarized wave and Stokes parameters $(S_1, S_2, S_3)=(-a, -b, -c)$ of the Y-polarized wave (Y_Pol.) after the rotation are obtained. The Stokes parameter values (a, b, c) and (−a, −b, −c) in this case respectively provide extremal values with maximum and minimum polarization dependent losses, and may be expressed by the following expression (3).

$$a=\pm M_{12}/\sqrt{M_{12}^2+M_{13}^2+M_{14}^2}$$

$$b=\pm M_{13}/\sqrt{M_{12}^2+M_{13}^2+M_{14}^2}$$

$$c=\pm M_{14}/\sqrt{M_{12}^2+M_{13}^2+M_{14}^2}$$

$$a^2+b^2+c^2=1 \quad (3)$$

The polarization state rotation control matrix $R(\theta, \phi)$ used in the rotation control may be expressed by the following expression (4).

$$R(\theta, \varphi) = \begin{Bmatrix} \cos(\theta/2) & -\sin(\theta/2) \\ \sin(\theta/2)\exp(i\varphi) & \exp(i\varphi)\cos(\theta/2) \end{Bmatrix} \quad (4)$$

Herein, i is a heterocyclic parameter, θ is a rotation angle from a focus vector $S_1$ to an $S_1$-$S_2$ axis on the Poincare sphere, and φ is a rotation angle of an $S_2$-$S_3$ axis in the $S_3$ direction on the Poincare sphere. These are expressed by the following expressions (5) and (6). The expression (5) is used for a case of b≥0, and the expression (6) is used for a case of b<0.

$$\theta=\arccos(M_{12}/\sqrt{M_{14}^2+M_{13}^2+M_{12}^2})$$

$$\varphi=\arcsin(M_{14}/\sqrt{M_{14}^2+M_{13}^2}) \quad (5)$$

$$\theta = \arccos(M_{12}/\sqrt{M_{14}^2 + M_{13}^2 + M_{12}^2})$$

$$\varphi = \pi - \arcsin(M_{14}/\sqrt{M_{14}^2 + M_{13}^2}) \quad (6)$$

In this manner, the control of rotating X-polarized waves and Y-polarized waves in a polarization state having the extremal values of the polarization dependent loss by the polarization state rotation control circuit allows the orthogonality of the X_Pol. and the Y_Pol. after the transmission to be maintained.

Details of the foregoing are described. Firstly, an extremal value problem of the polarization dependent loss is described. The polarization dependent loss penetrating characteristics of the measurement transmission line may be expressed by the following expression (7). In other words, when $S_0=1$ is the input reference power level (constant) in FIG. 4A, $S_{0\_out}$ is represented by a symbol T. In this case, $$T = M_{11} + M_{12} \times S_1 + M_{13} \times S_2 + M_{14} \times S_3 \quad (7)$$

Herein, $M_{11}$ is a constant, and $M_{12} \times S_1 + M_{13} \times S_2 + M_{14} \times S_3$ is an input polarization state dependent component.

Figure 6:
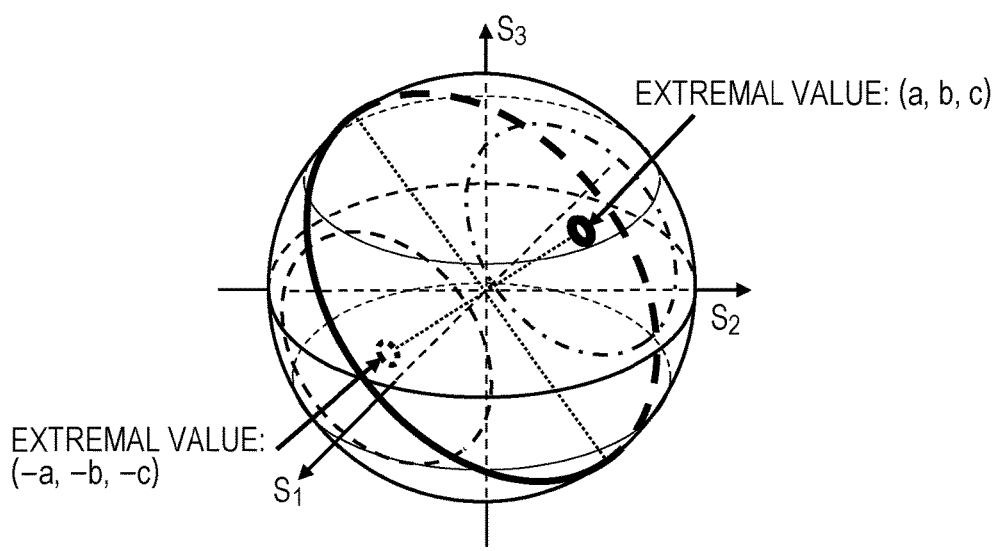
FIG. 6 illustrates one example of the Poincare sphere indicating the distribution of the polarization states which experience equal transmittance.

When $T = M_{11}$, the expression (7) becomes an equation of a plane including an origin point. Accordingly, the polarization state $M_{12} \times S_1 + M_{13} \times S_2 + M_{14} \times S_3 = 0$ that is distributed in a circle (for example, a circle of the dot-and-dash line and a circle of the dashed line) in parallel with the plane including the origin point illustrated in FIG. 6 experience equal transmittance. In other words, $M_{12} \times S_1 + M_{13} \times S_2 + M_{14} \times S_3 =$ constant is obtained. Stokes parameters (a, b, c) that provide an extremal value correspond to $S_1$, $S_2$, $S_3$ with the maximum T, and Stokes parameters (−a, −b, −c) that provides an extremal value correspond to $S_1$, $S_2$, $S_3$ with the minimum T. The expression (3) indicates this result.

Next, the power level imbalance control is described. The receiving apparatus 2 estimates the polarization state rotation control matrix $R(\theta, \varphi)$, and estimates the power level imbalance inverse operation control matrix $C(\rho)$ in order to suppress the signal degradation due to the power level imbalance after the transmission.

Figure 7:
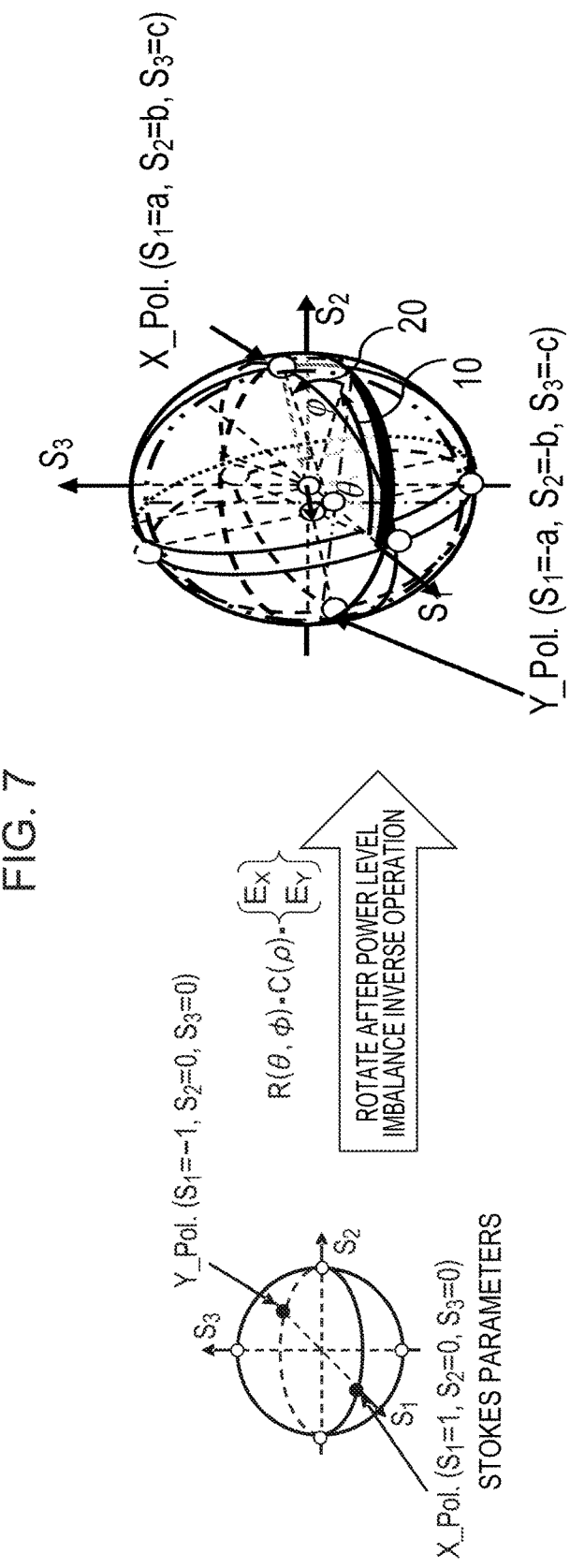
FIG. 7 is a diagram for explaining an implementation method of a power level imbalance inverse operation control matrix $C(\rho)$.

One example of an estimation method of the power level imbalance inverse operation control matrix $C(\rho)$ is described using FIG. 7. The power level imbalance between the X-polarized wave (X_Pol.) and the Y-polarized wave (Y_Pol.) after the transmission may be calculated by the following expression (8).

$$\begin{Bmatrix} E_{X\_out} \\ E_{Y\_out} \end{Bmatrix} = \begin{Bmatrix} \sqrt{1+\rho} & 0 \\ 0 & \sqrt{1-\rho} \end{Bmatrix} \cdot \begin{Bmatrix} E_{X\_in} \\ E_{Y\_in} \end{Bmatrix} \quad (8)$$

$$\rho = \sqrt{M_{12}^2 + M_{13}^2 + M_{14}^2} / M_{11}$$

Herein, $\rho$ is a parameter representing the extent of the power level imbalance, and $\rho=0$ represents a balanced state. Moreover, the coefficient matrix being a diagonal matrix indicates that the X component and the Y component have no power level dependence.

Therefore, it is possible to suppress the signal degradation due to the power level imbalance by a control of multiplying an inverse matrix of a matrix by which the polarization components ($E_{X\_in}$, $E_{Y\_in}$) before the transmission in the expression (8) are multiplied, in other words, by multiplying the power level imbalance inverse operation control matrix $C(\rho)$. Specifically, as illustrated in FIG. 7, after the power level imbalance inverse computation control of X_Pol. and Y_Pol. is performed at the transmitting apparatus 1 side, the above-described rotation control is performed to make it possible to suppress the signal degradation due to the transmission. The power level imbalance inverse operation control matrix $C(\rho)$ may be expressed as the following expression (9) by an inverse matrix.

$$C(\rho) = \begin{Bmatrix} \sqrt{(1+\rho)} & 0 \\ 0 & \sqrt{(1-\rho)} \end{Bmatrix}^{-1} = \begin{Bmatrix} 1/\sqrt{(1+\rho)} & 0 \\ 0 & 1/\sqrt{(1-\rho)} \end{Bmatrix} \quad (9)$$

$C(\rho)$ is calculated by the inverse matrix process of a diagonal matrix including a diagonal component controlled by $\rho$ in the expression (8). By multiplying $C(\rho)$ by the polarization component before the transmission, the polarization state after the transmission is distributed on the circle including the center of the Poincare sphere.

Herein, FIG. 8 illustrates a configuration example of a control circuit of the transmitting apparatus 1. A DSP control circuit 82 executes the process of the controller 11, and a polarization multiplexing modulator 80 and a DAC 81 executes the process of the transmitter 10.

The DSP control circuit 82 performs, with respect to data ($E_X$, $E_Y$) of polarization components of a transmission signal (main data signal), a power level imbalance inverse computation control in order to suppress the signal degradation due to the power level imbalance, and further performs a polarization state rotation control in order to suppress the signal degradation due to a crosstalk.

A Laser Diode (LD) 83 is a light source that generates light for transmission, and inputs the generated light into respective an X modulator 84a and an Y modulator 84b.

The DAC 81 converts data $E_X{'}$ of the polarization component superimposed on the X-polarized waves into an analog signal, converts data $E_Y{'}$ of the polarization component superimposed on the Y-polarized waves into an analog signal, and inputs the analog signals into the respective modulators 84a, 84b.

The X modulator 84a modulates light from the LD 83 with the signal inputted from the DAC 81 to generate a transmission modulation signal of X-polarized waves. The Y modulator 84b modulates light from the LD 83 with the signal inputted from the DAC 81 to generate a transmission modulation signal of Y-polarized waves. The polarization multiplexing modulation method in this case includes, for example, Quadrature Phase Shift Keying (QPSK: phase shift modulation method) and 8 Quadrature Amplitude Modulation (8QAM: orthogonal amplitude modulation), but is not dependent on the modulation method. The QPSK refers to a modulation method in which the phase of a reference signal is modulated or changed to transmit data. The QAM refers to a modulation method in which the modulation is performed using the amplitude and the phase.

In this case, signals outputted from the X modulator 84a and the Y modulator 84b are in parallel with each other, so that, for example, the transmission modulation signal of X-polarized waves outputted from the X modulator 84a is changed to the orthogonal polarization state to the Y-polarized wave by half-wave plate ($\lambda/2$), a coupler 85 couples the respective signals and transmits the coupled signal to the transmission line 3 (shown in FIG. 1).

Noted that the configuration of the polarization multiplexing modulator 80 is merely an example and is not limited to the above, but may be employ another configuration.

Figure 9A:
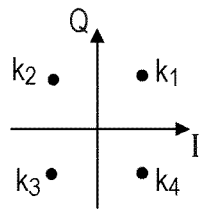
FIG. 9A is a diagram illustrating the phase arrangement of QPSK.
Figure 9B:
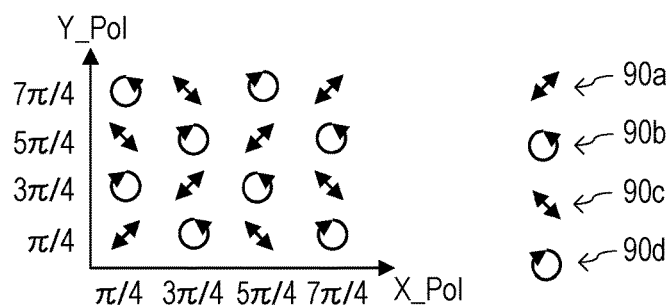
FIG. 9B is a diagram illustrating a polarization state after X-polarized waves and Y-polarized waves are coupled.

Herein, a polarization state of a QPSK signal when the modulation method used in the polarization multiplexing modulator 80 is the QPSK is described. The power level of X-polarized waves and the power level of Y-polarized waves in the QPSK signal are the same, so that the polarization state is decided depending on a phase difference. FIG. 9A illustrates a phase arrangement diagram of the QPSK, and FIG. 9B illustrates a polarization state after the coupling of X-polarized waves and Y-polarized waves. Four signals the phase each of which is shifted by 90 degrees is used in the QPSK, and the signal phase of the QPSK signal $\Phi_{kn}$ is $\pi \times (2n-1)/4$.

In the abovementioned case, the Stokes parameters are distributed on the same circle. For example, a state 90a illustrated in FIG. 9B corresponds to a state 91a on the Poincare sphere illustrated in FIG. 9C. Moreover, a state 90b illustrated in FIG. 9B corresponds to a state 91b on the Poincare sphere illustrated in FIG. 9C. Moreover, a state 90c illustrated in FIG. 9B corresponds to a state 91c on the Poincare sphere illustrated in FIG. 9C. Moreover, a state 90d illustrated in FIG. 9B corresponds to a state 91d on the Poincare sphere illustrated in FIG. 9C.

Figure 9C:
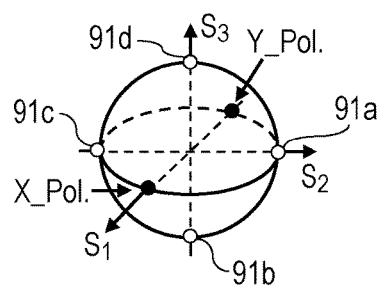
FIG. 9C is a diagram illustrating the Poincare sphere indicating the polarization states in FIG. 9B.

Moreover, as for Stokes parameters $(S_1, S_2, S_3)$, as illustrated in FIG. 9C, $S_1$ is obtained such that the square of data $E_y$ of the Y polarization component is subtracted from the square of data $E_x$ of the X polarization component. The power level of X-polarized waves and the poser of Y-polarized waves in the QPSK signal are the same as described above, so that $S_1$ becomes 0. By using the representation * of a conjugate *, $S_2$ is $2 \times \text{Re}(E_x E_y^*)$, and $S_3$ is $-2 \times \text{Im}(E_x E_y^*)$, in which Re $(E_x E_y^*)$ of $S_2$ is a real part of $E_x E_y^*$, Im $(E_x E_y^*)$ of $S_3$ is an imaginary part of $E_x E_y^*$.

Figure 10:
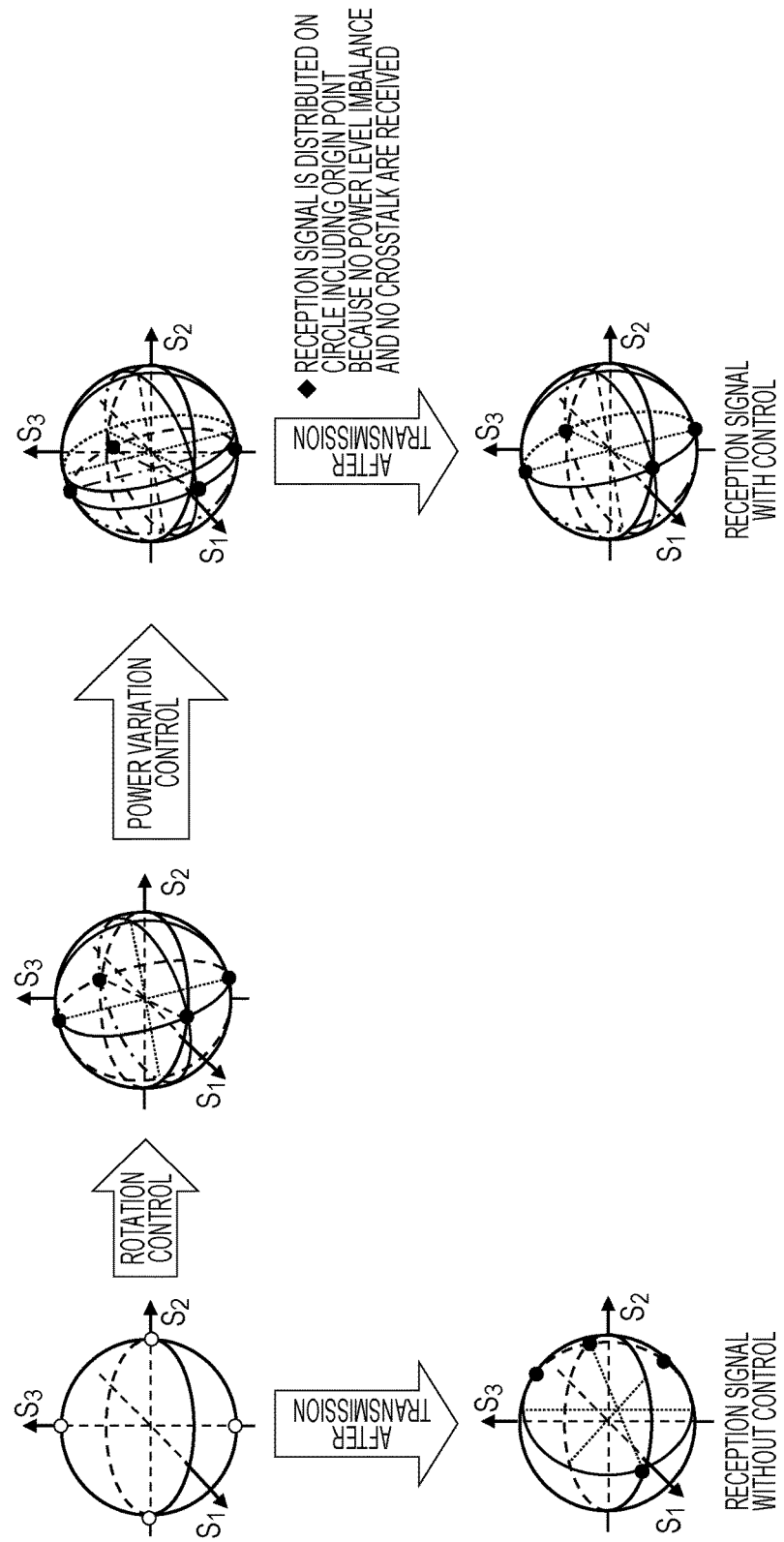
FIG. 10 is a diagram for explaining a control example of suppressing the PDL (a case of a QPSK signal)

A control example (a case of a QPSK signal) of suppress PDL is described using FIG. 10. Herein, a case where the polarization state during the transmission is not rotated is described. The polarization state before the transmission is evenly distributed on the circle including the origin point of the Poincare sphere. When the signal is transmitted in this state without performing the control of suppressing PDL, in a reception signal (reception signal without the control) in the receiving apparatus 2, the polarization state is distributed on a circle including no origin point. In other words, the transmission without the control generates a difference of the power levels between the X-polarized waves (SOP1) and the Y-polarized waves (SOP2). Moreover, the orthogonality of the SOP1 and the SOP2 is also lost, so that the polarization state of a coupled signal of the SOP1 and the SOP2 is not evenly distributed on a circle including no origin point.

Herein, the SOP1 and the SOP2 respectively indicate a channel 1 and a channel 2 in a polarization multiplexing signal. The SOP1 and the SOP2 are the same as the output polarization states of an X modulator and an Y modulator of the polarization multiplexing modulator before the rotation control, however, the SOP1 and the SOP2 are different from the output polarization states of the X modulator and the Y modulator of the polarization multiplexing modulator after the rotation control. The X-polarized wave data is referred to as SOP1, and the Y-polarized wave data is referred to as SOP2.

Meanwhile, to control of suppressing PDL, in other words, so as not to receive influences of the power level imbalance and the crosstalk, the rotation control and the power level imbalance (power level variation) control with respect to a transmission signal is performed at the transmitting apparatus 1 side. The transmission signal is rotated in advance and is further controlled to be apart from the origin point of the Poincare sphere, so that the reception signal after the transmission is evenly distributed on a circle including the origin point of the Poincare sphere, thereby making it possible to suppress the influence of the PDL.

Further, the rotation of the polarization state during the transmission does not exert an influence of an effect of the control because a relative relation between the X-polarized waves and the Y-polarized waves does not change.

Figure 11A:
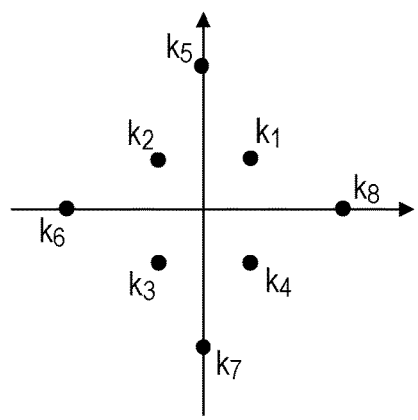
FIG. 11A is a diagram illustrating the phase arrangement of 8QAM.
Figure 11B:
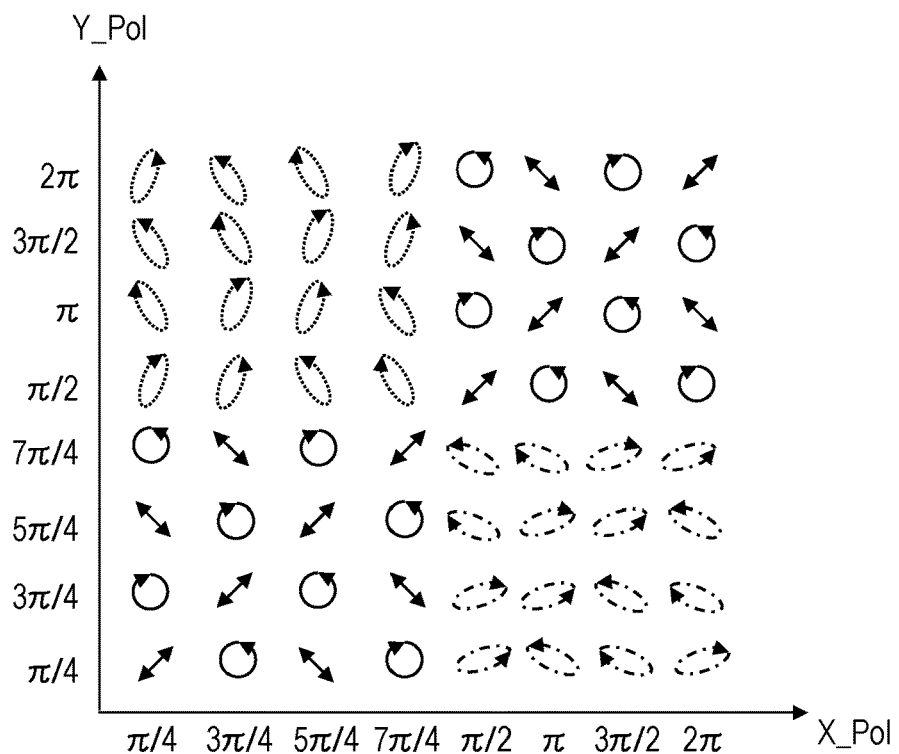
FIG. 11B is a diagram illustrating a polarization state after X-polarized waves and Y-polarized waves are coupled in the 8QAM.
Figure 12:
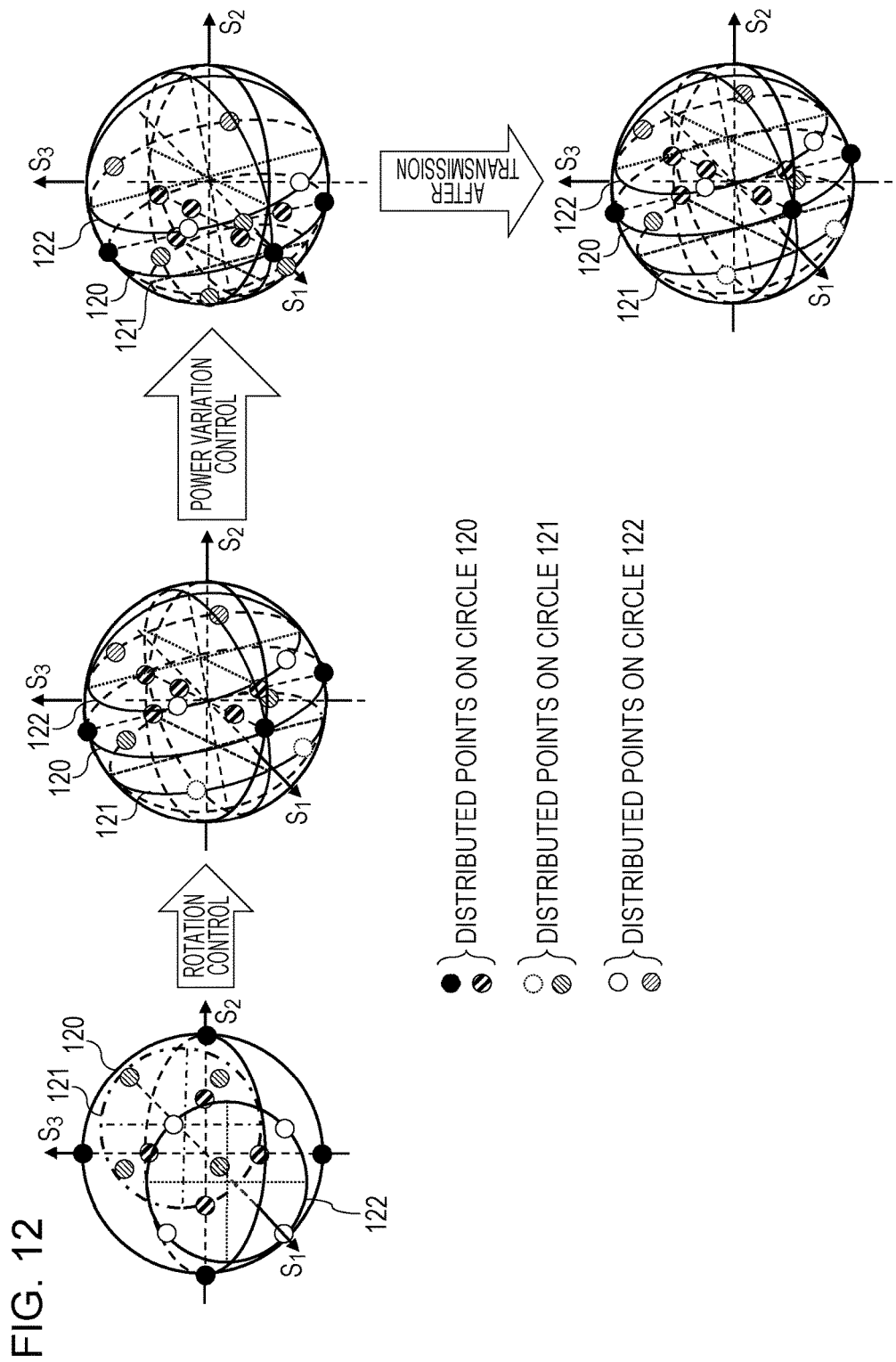
FIG. 12 is a diagram for explaining a control example of suppressing the PDL (a case of an 8QAM signal)

Moreover, a control example (a case of 8QAM signal) of suppressing PDL is described using FIG. 11A, FIG. 11B, and FIG. 12. Also herein, a case where the polarization state during the transmission is not rotated is described. FIG. 11A illustrates a phase arrangement diagram of the 8QAM, and FIG. 11B illustrates a polarization state after X-polarized waves and Y-polarized waves are coupled in the 8QAM. A signal phase $\Phi_{kn}$ of the 8QAM signal is $n \times \pi/4$. Twelve polarization states are distributed on three circles of the Poincare sphere illustrated in FIG. 12, and the polarization states of the solid line, the dashed line, and the dot-and-dash line in FIG. 11B are respectively distributed on the three circles.

The distribution corresponding to a polarization state (linear polarized-wave, circular polarized-wave) indicated by the solid line in FIG. 11B is a circle 120, the distribution corresponding to a polarization state (elliptic polarized-wave of four different polarization states) indicated by the dashed line in FIG. 11B is a circle 121, and the distribution corresponding to a polarization state (elliptic polarized-wave of four different polarization states) indicated by the dot-and-dash line in FIG. 11B is a circle 122.

Out of the polarization states before the transmission, the polarization state indicated by the solid line is distributed on the circle including the origin point of the Poincare sphere, and the other polarization states are distributed on the circles including no origin point of the Poincare sphere.

Also in this control example, when the signal is transmitted in this state without performing the control of suppressing PDL, in a reception signal (reception signal without the control) in the receiving apparatus 2, the polarization state is not evenly distributed on the circle including no origin point (not illustrated).

Meanwhile, so as not to receive influences of the power level imbalance and the crosstalk, the rotation control and the power level imbalance (power level variation) control with respect to a transmission signal is performed at the transmitting apparatus 1 side. Also in this case, similar to the control example in the case of the QPSK signal, a transmission signal is rotated in advance and is further controlled to be apart from the origin point of the Poincare sphere, so that the reception signal after the transmission is evenly distributed on a circle including the origin point of the Poincare sphere or a circle in parallel with the circle, thereby making it possible to suppress the influence of the PDL. Further, the rotation of the polarization state during the transmission does not exert an influence of an effect of the control because a relative relation between the X-polarized waves and the Y-polarized waves does not change.

Figure 13:
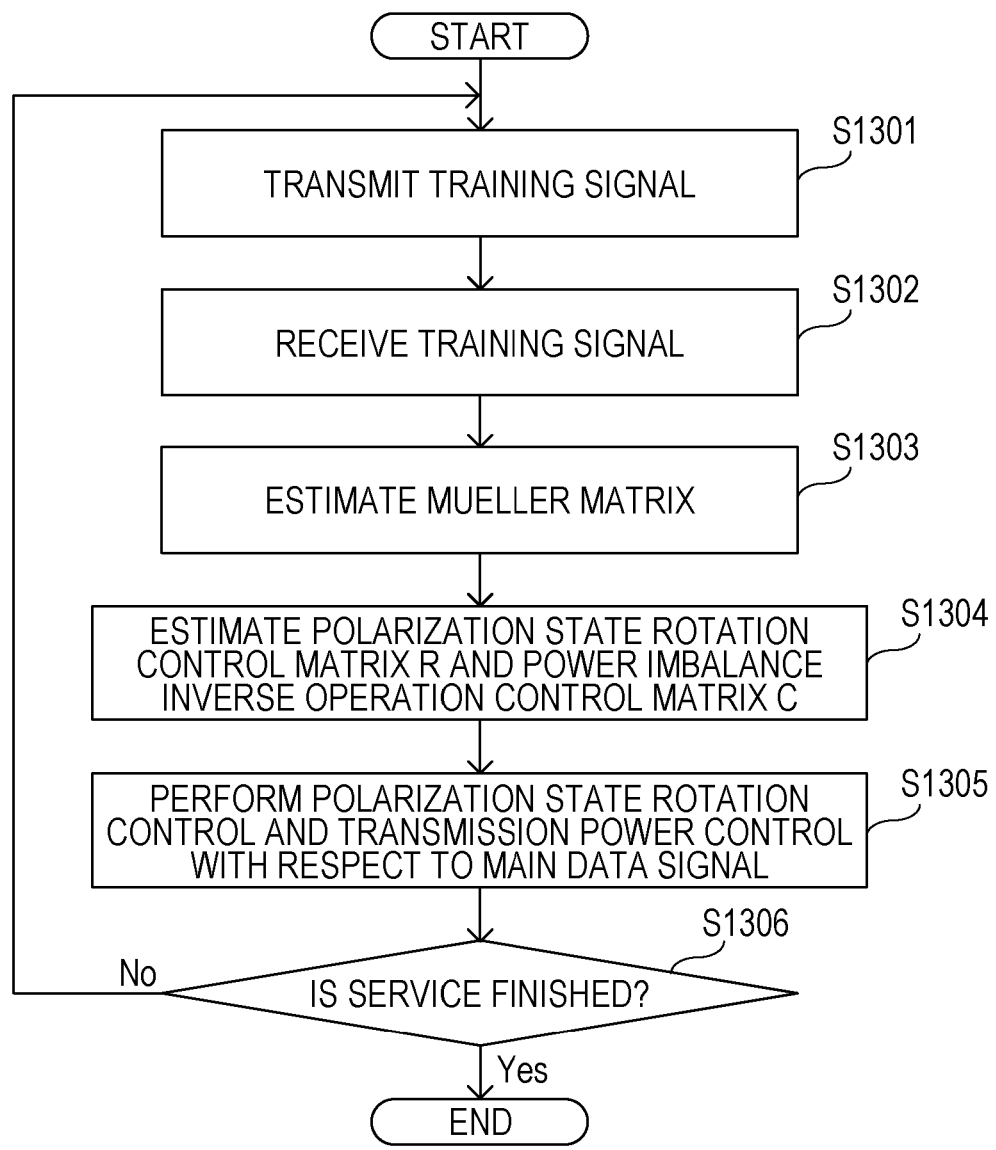
FIG. 13 is a flowchart illustrating an operation flow of a control process of a main data signal from the transmitting apparatus in the embodiment.

Next, an operation flow of a control process of a main data signal (transmission signal) from the transmitting apparatus 1 in the embodiment is described using FIG. 13. The transmitter 10 transmits a training signal (for example, detection signal including four polarization states on the Poincare sphere) through the transmission line 3 to the receiving apparatus 2 (Step S1301). In this case, the transmitter 10 periodically transmits a training signal.

The receiving apparatus 2 receives the transmitted training signal (Step S1302). The receiving apparatus 2 estimates a Mueller matrix of the transmission line 3 based on the received training signal (Step S1303), and estimates, using the estimated Mueller matrix, the polarization state rotation control matrix R(θ, ϕ) and the power level imbalance inverse operation control matrix C(ρ) (Step S1304). The estimation of the polarization state rotation control matrix R(θ, ϕ) and the power level imbalance inverse operation control matrix C(ρ) may be performed, not by the receiving apparatus 2, but by a server 150, which is described later and shown in FIG. 15, and an estimation result is transmitted from the server 150 to the transmitting apparatus 1.

The controller 11 receives the estimated polarization state rotation control matrix R(θ, ϕ) and the power level imbalance inverse operation control matrix C(ρ), and performs, based on each matrix, rotation control and transmission power level control of the polarization state of the polarization component of the main data signal (Step S1305). The controller 11 determines whether the service of the control process is finished (Step S1306), and returns the process to Step S1301 if the control process is not finished (No at Step S1306).

Figure 14A:
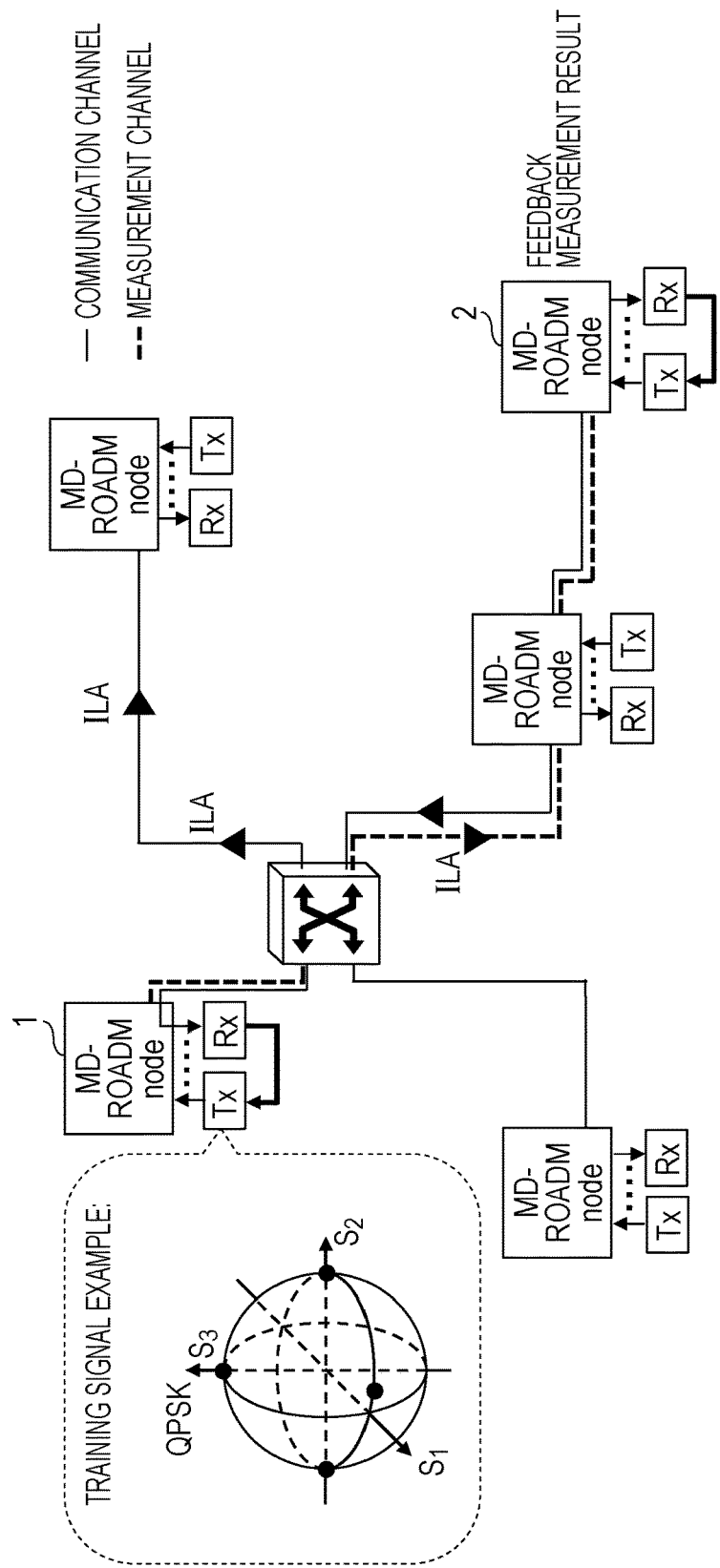
FIG. 14A is a diagram illustrating a configuration example of a transmission system including the transmitting apparatus and a receiving apparatus in the embodiment.
Figure 15:
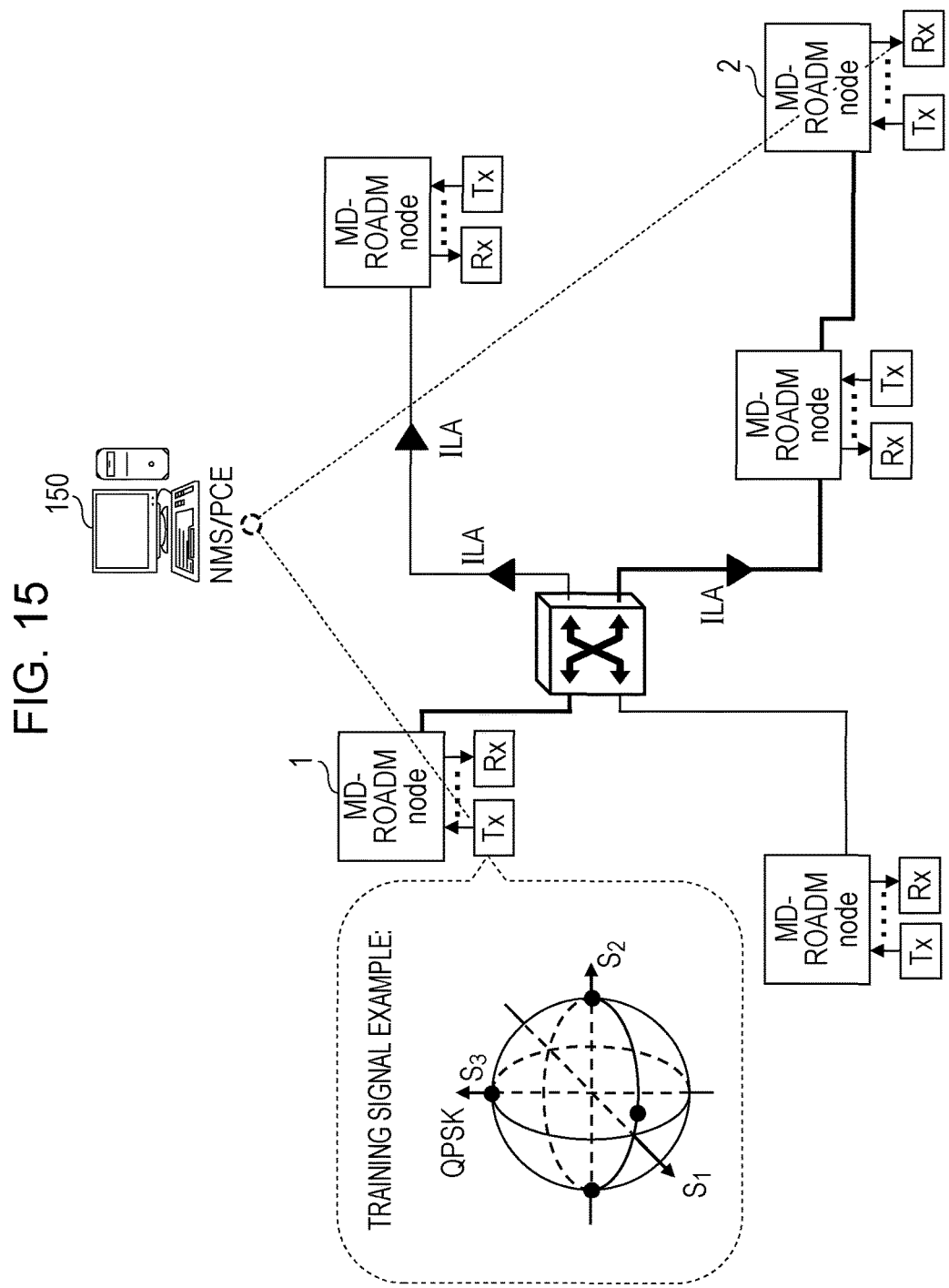
FIG. 15 is a diagram illustrating a configuration example of a transmission system including the transmitting apparatus and the receiving apparatus in the embodiment.
Figure 16:
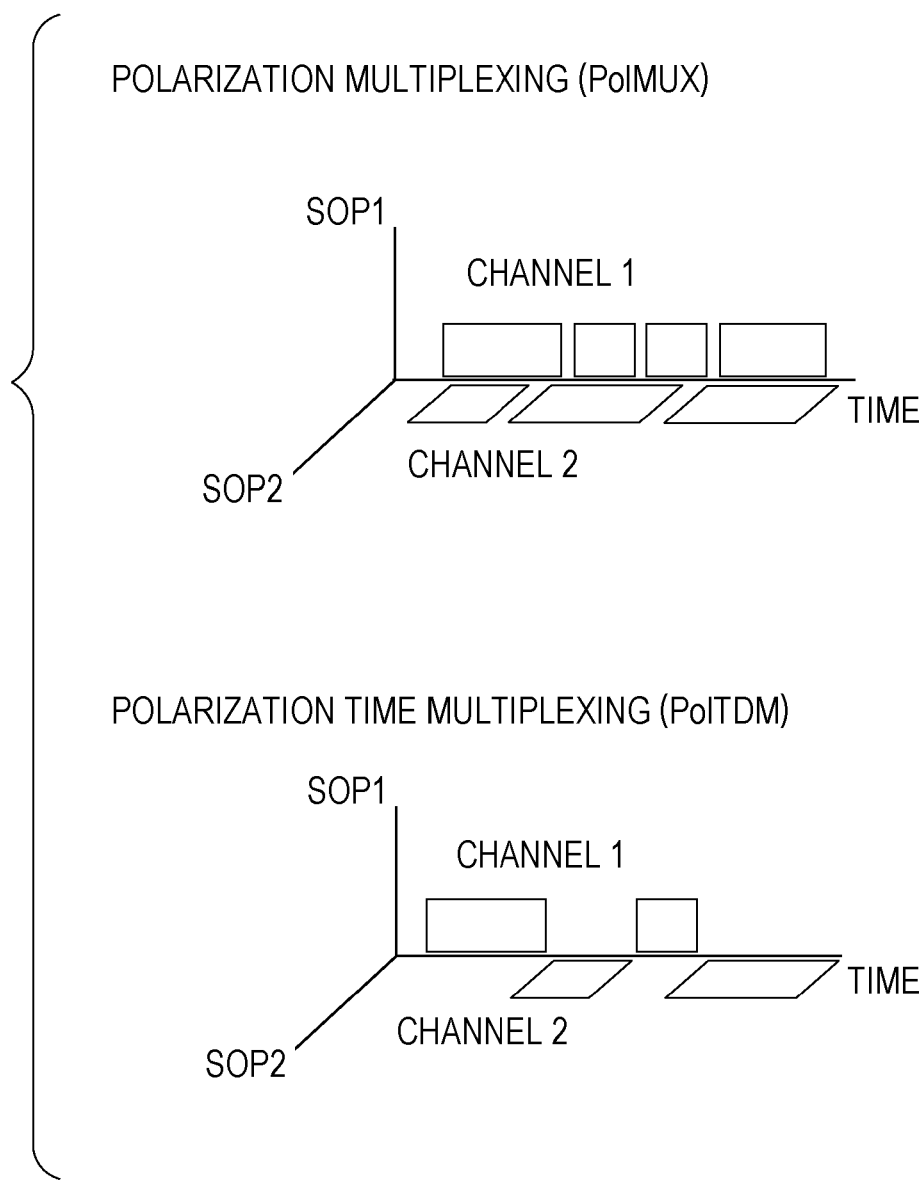
FIG. 16 is a diagram for explaining a polarization multiplexing technology and a polarization time multiplexing technology.
Figure 17:
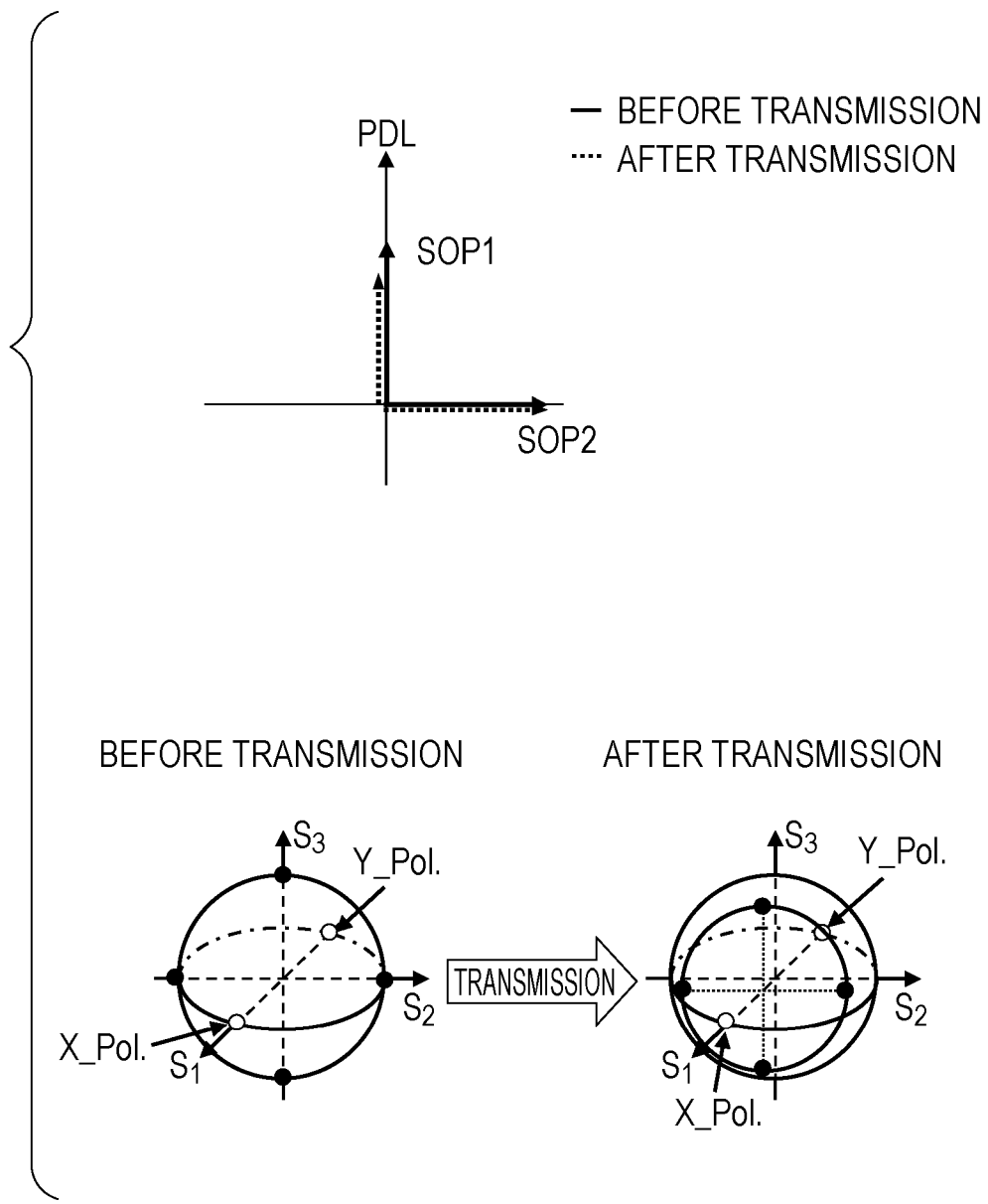
FIG. 17 is a diagram for explaining the signal degradation due to the power level imbalance.
Figure 18:
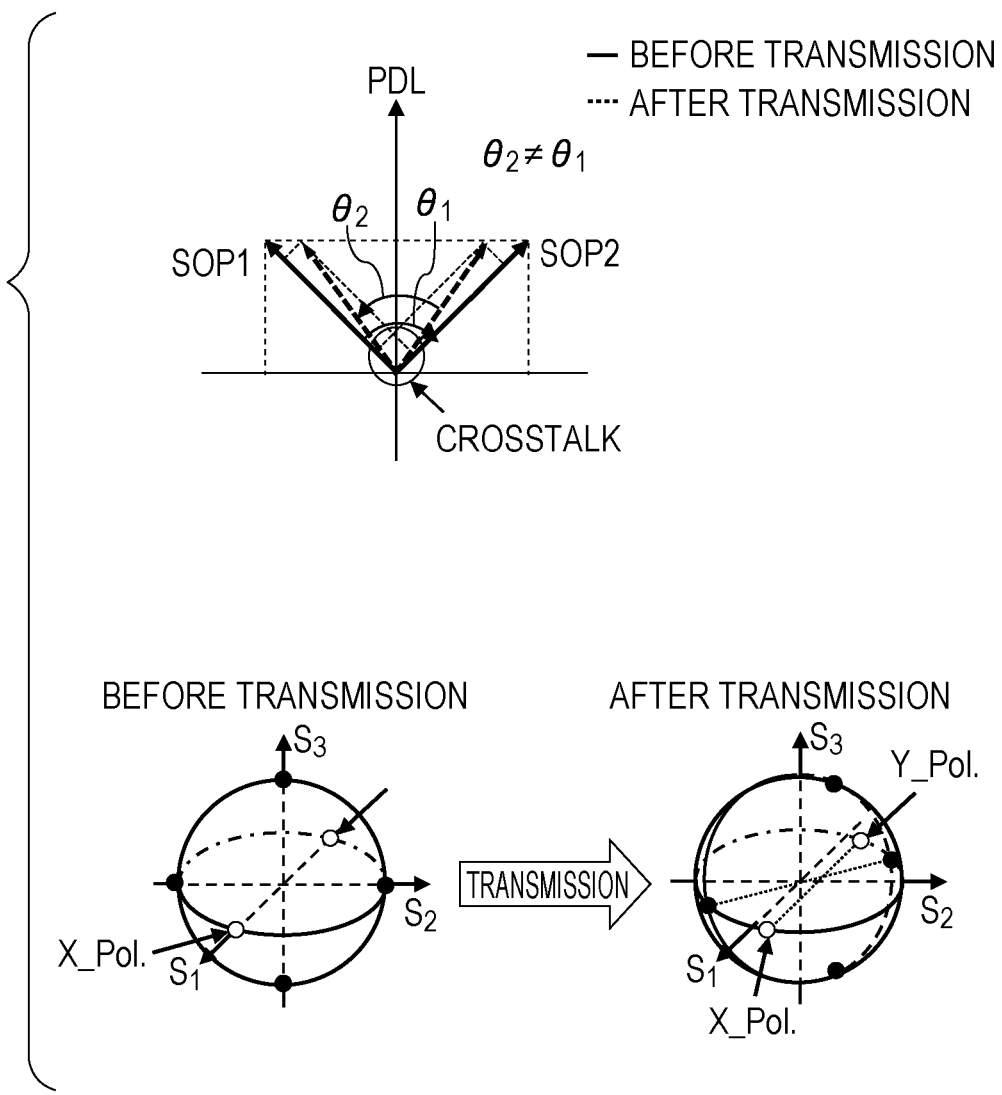
FIG. 18 diagram for explaining the signal degradation due to a loss of orthogonality.
Figure 19:
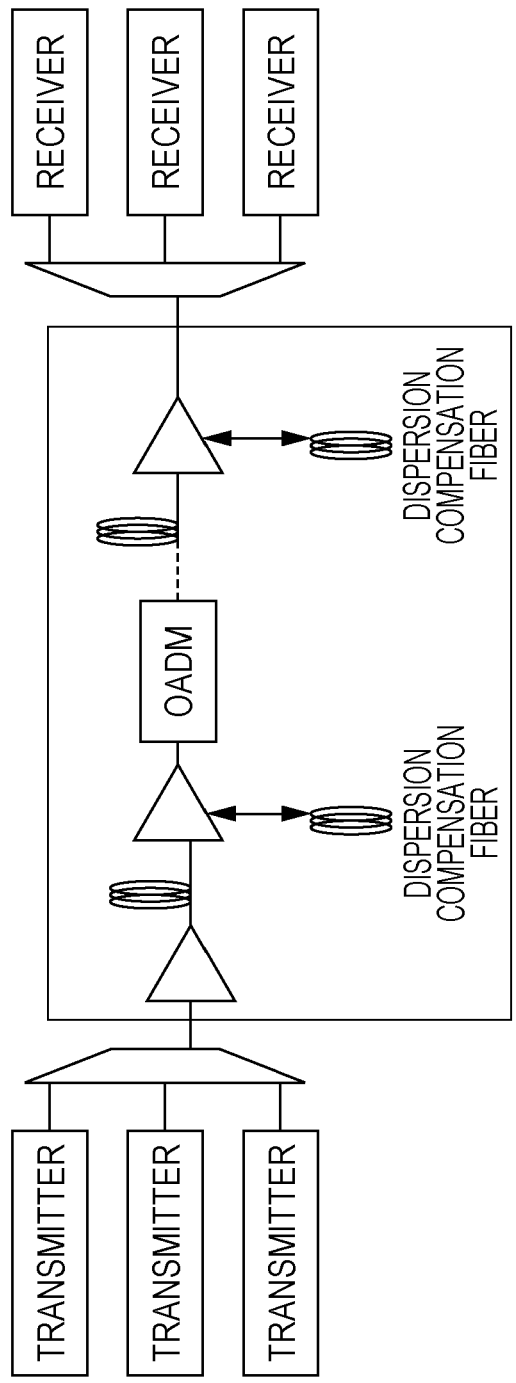
FIG. 19 is a diagram for explaining one method, out of methods of suppressing the signal degradation.
Figure 20A:
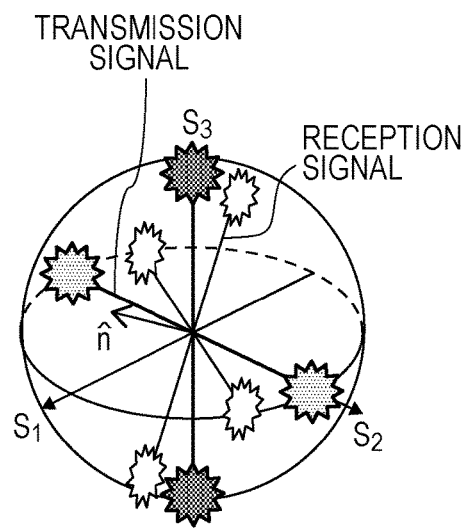
FIGS. 20A to 20D are diagrams for explaining another method, out of the methods of suppressing the signal degradation.
Figure 20B:
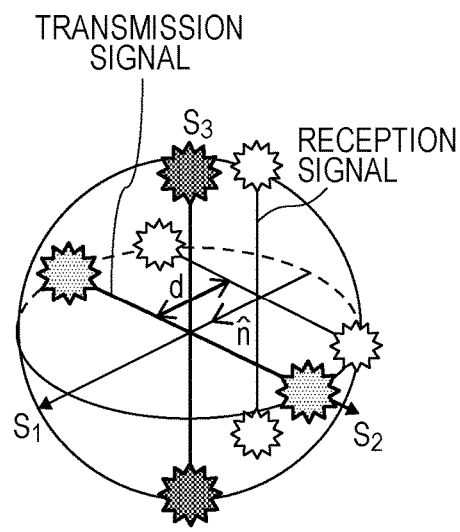
Figure 20C:
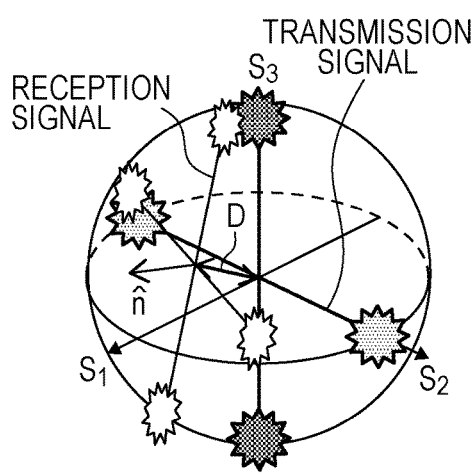
Figure 20D:
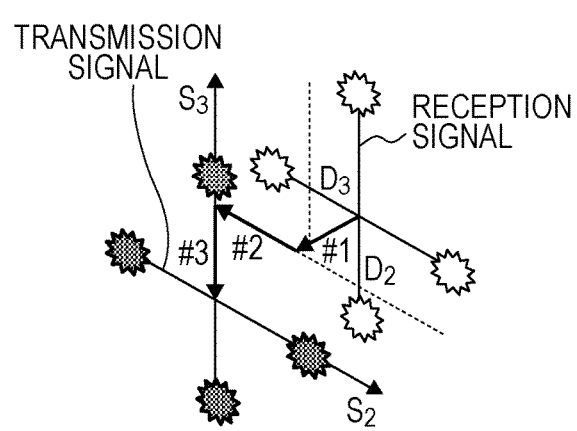

Herein, two configuration examples of a including the transmitting apparatus 1 and the receiving apparatus 2 is described using FIG. 14A and FIG. 15. Noted that both of the polarization multiplexing and of the polarization time multiplexing are applicable in the transmission system.

Firstly, the first configuration example is described using FIG. 14A. This configuration example is such a configuration that the receiving apparatus 2 estimates a Mueller matrix, and estimates the polarization state rotation control matrix R(θ, ϕ) and the power level imbalance inverse operation control matrix C(ρ), and transmits (feeds back) an estimation result to the transmitting apparatus 1. As described above, the configuration example may be such a configuration that the controller 11 of the transmitting apparatus 1 estimates a Mueller matrix, and estimates the polarization state rotation control matrix R(θ, ϕ) and the power level imbalance inverse operation control matrix C(ρ). In this case, the receiving apparatus 2 transmits Stokes parameters of the power level of the received training signal to the transmitting apparatus 1.

Figure 14B:
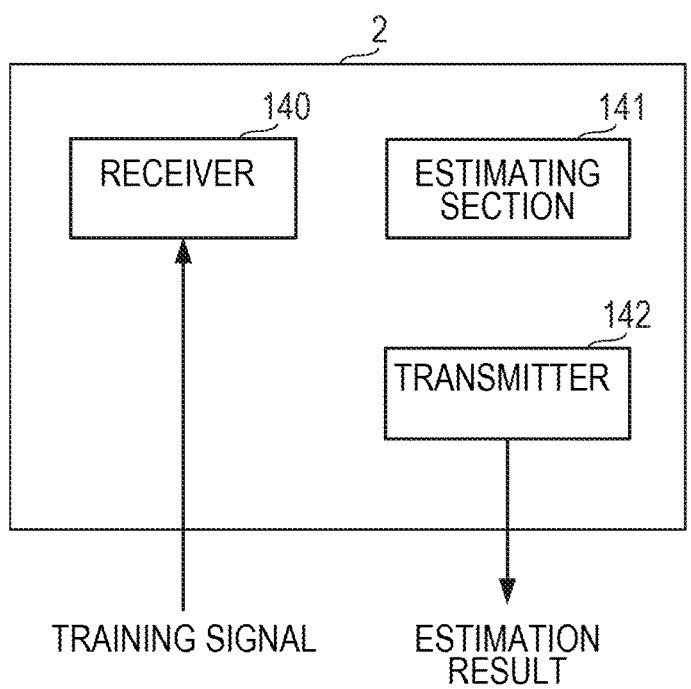
FIG. 14B is a functional block diagram of the receiving apparatus in the embodiment.

FIG. 14B illustrates a function configuration of the receiving apparatus 2 in the first configuration example and the second configuration example. The receiving apparatus 2 includes a receiver 140, an estimating section 141, and a transmitter 142.

A training signal including four polarization states is transmitted by the transmitting apparatus (MD-ROADM node) 1 from a transmitter (TX). In this case, the training signal is transmitted to the receiving apparatus (MD-ROADM node) 2 via an In-Line Amplifier (ILA: relay device).

In the receiving apparatus 2, the receiver 140 (receiver: RX) receives the training signal, and the estimating section 141 estimates a Mueller matrix based on Stokes parameters of the power level of the received training signal. The estimating section 141 of the receiving apparatus 2 estimates the polarization state rotation control matrix R(θ, ϕ) and the power level imbalance inverse operation control matrix C(ρ) based on one matrix element of the estimated Mueller matrix, and the transmitter 142 (transmitter: TX) transmits an estimation result to the transmitting apparatus 1. The estimating section 141 may be implemented by using a processor including a CPU, a digital signal processor (DSP), a microprocessor or a programmable logic device (PLD).

The transmitting apparatus 1 receives the estimated polarization state rotation control matrix R(θ, ϕ) and the power level imbalance inverse operation control matrix C(ρ) by the receiver (RX), and performs polarization state control (polarization state rotation control and power level imbalance inverse computation control) of a main data signal (transmission signal) using the received respective matrices.

Next, the second configuration example is described using FIG. 15. This configuration example is such a configuration that the receiving apparatus 2 estimates one matrix element of a Mueller matrix, and the server (network management system (NMS)/path computation element (PCE)) 150 estimates the polarization state rotation control matrix R(θ, ϕ) and the power level imbalance inverse operation control matrix C(ρ) based on one matrix element of the estimated Mueller matrix using the estimated Mueller matrix and transmits (feeds back) an estimation result to the transmitting apparatus 1.

A training signal including four polarization states is transmitted by the transmitting apparatus (MD-ROADM node) 1 from a transmitter (TX). In this case, the training signal is transmitted to the receiving apparatus (MD-ROADM node) 2 via the ILA.

In the receiving apparatus 2, the receiver 140 (receiver: RX) receives the training signal, and the estimating section 141 estimates a Mueller matrix based on Stokes parameters of the power level of the received training signal.

The server 150 acquires the Mueller matrix estimated by the receiving apparatus 2, estimates the polarization state rotation control matrix R(θ, ϕ) and the power level imbalance inverse operation control matrix C(ρ), and transmits an estimation result to the transmitting apparatus 1.

The transmitting apparatus 1 receives the estimated polarization state rotation control matrix R(θ, ϕ) and the power level imbalance inverse operation control matrix C(ρ) by the receiver (RX), and performs polarization state control (polarization state rotation control and power level imbalance inverse computation control) of a main data signal (transmission signal) using the received respective matrices.

With one aspect of the transmitting apparatus 1 in the embodiment, based on the result of the polarization dependent characteristics of the transmission line, rotation control and transmission power level control are performed for the polarization states of the polarization component of the main data signal, so that it is possible to suppress an influence of the polarization dependent loss. Moreover, a training signal having a specific polarization state due to the digital polarization modulation is inserted on the time axis, and a coherent receiver analyzes the power level of the training signal after the transmission, so that it is possible to attain the high-speed data measurement of the polarization dependent penetrating characteristics in the transmission line, and the following properties to the polarization variation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method of controlling a transmission signal, comprising:
   transmitting a training signal including four polarization states having a given relation with respect to each other with regard to a rotation of each of the polarization states during transmission and at least one polarization state being a circular polarized-wave or an elliptical polarized-wave and the four polarization states being elliptic polarized-waves, circular polarized-waves or linear polarized-waves and different from one another; and performing rotation control and transmission power level control of a polarization component of a data signal, based on a rotation control matrix for a polarization state and an inverse-operation control matrix for a power level imbalance, which are estimated from Stokes parameters related to input power level present on a Poincare sphere acquired from the training signal and Stokes parameters related to output power level present on the Poincare sphere.

2. The method of controlling a transmission signal according to claim 1, further comprising estimating an output power level of a Mueller matrix from the Stokes parameters compared to the input power level, and the input state of polarization present on the Poincare sphere acquired from the training signal and the Stokes parameters compared to the output power level present on the Poincare sphere, wherein the rotation control and the transmission power level control are performed based on a rotation control matrix for a polarization state and an inverse-operation control matrix for a power level imbalance estimated from the Mueller matrix.

3. The method of controlling a transmission signal according to claim 2, wherein the inverse-operation control matrix for the power level imbalance is calculated by an inverse matrix process of a diagonal matrix including a parameter for indicating an extent of a power level imbalance as a component.

4. The method of controlling a transmission signal according to claim 1, wherein the rotation control is control to rotate a polarization state of the polarization component of the data signal to a polarization state having an extremal value of a polarization dependent loss.

5. The method of controlling a transmission signal according to claim 1, wherein the training signal is subjected to a single-side-polarization signal modulation.

6. The method of controlling a transmission signal according to claim 1, wherein the training signal includes the four polarization states having the given relation, output power level of a Y polarization component is not 0, and power level of an X polarization component is in a level imbalance.

7. The method of controlling a transmission signal according to claim 1, wherein the Stokes parameters compared to the output power level present on the Poincare sphere is in a level imbalance.

8. A method of controlling a transmission signal, comprising:
receiving a training signal including four polarization states having a given relation with respect to each other with regard to a rotation of each of the polarization states during transmission and at least one polarization state being a circular polarized-wave or an elliptical polarized-wave and the four polarization states being elliptic polarized-waves, circular polarized-waves or linear polarized-waves and different from one another; and estimating an element, related to power level of a Mueller matrix, from Stokes parameters related to input power level, and the input state of polarization present on a Poincare sphere acquired from the training signal and Stokes parameters related to output power level present on the Poincare sphere.

9. An optical communication device comprising:
an optical transmitter configured to transmit an optical training signal including four polarization states having a given relation with respect to each other with regard to a rotation of each of the polarization states during transmission and at least one polarization state being a circular polarized-wave or an elliptical polarized-wave and the four polarization states being elliptic polarized-waves, circular polarized-waves or linear polarized-waves and different from one another; and a processor configured to perform rotation control and transmission power level control of a polarization component of a data signal, based on a rotation control matrix for a polarization state and an inverse-operation control matrix for a power level imbalance, which are estimated from Stokes parameters related to input power level, and the input state of polarization present on a Poincare sphere acquired from the optical training signal and Stokes parameters related to output power level present on the Poincare sphere.

10. The optical communication device according to claim 9, further comprising estimating an output power level of a Mueller matrix from the Stokes parameters compared to the input power level, and the input state of polarization present on a Poincare sphere acquired from the optical training signal and the Stokes parameters compared to the output power level present on the Poincare sphere, wherein the rotation control and the transmission power level control are performed based on a control matrix for a polarization state rotation and an inverse-operation control matrix for a power level imbalance estimated from the Mueller matrix.

11. The optical communication device according to claim 10, wherein the inverse-operation control matrix for the power level imbalance is calculated by an inverse matrix process of a diagonal matrix including a parameter indicating an extent of the power level imbalance as a component.

12. The optical communication device according to claim 9, wherein the rotation control is control to rotate a polarization state of the polarization component of the data signal to a polarization state having an extremal value of a polarization dependent loss.

13. The optical communication device according to claim 9, wherein the optical training signal is subjected to a single-side-polarization signal modulation.

14. The optical communication device according to claim 9, wherein the optical training signal includes the four polarization states having the given relation, output power level of a Y polarization component is not 0, and power level of an X polarization component is in a level imbalance.

15. An optical communication device comprising:
a transmitter that transmits a training signal that includes four polarization states on a Poincare sphere having a given relation with respect to each other with regard to a rotation of each of the polarization states during transmission and at least one polarization state being a circular polarized-wave or an elliptical polarized-wave and the four polarization states being elliptic polarized-waves, circular polarized-waves or linear polarized-waves and different from one another;

a receiver that receives the training signal via a transmission line;

an estimator that estimates a Mueller matrix, a polarization state rotation control matrix, and a power level imbalance inverse operation control matrix based on the training signal; and a controller that performs rotation control and transmission power level control of polarization components of a data signal based on the polarization state rotation control matrix and the power level imbalance inverse operation control matrix to transmit the data signal with a reduced loss of transmission capacitance.

16. The optical communication device of claim 15, wherein the estimator estimates the Mueller matrix from Stokes parameters compared to an input power level, and the input state of polarization present on the Poincare sphere acquired from the training signal.

17. The optical communication device of claim 15, wherein the transmitter includes a polarization multiplexing modulator or a digital to analog converter.

18. The optical communication device of claim 15, wherein the controller includes a digital signal processor or a programmable logic device.

* * * * *